United States Patent
Jin et al.

(10) Patent No.: US 11,115,886 B2
(45) Date of Patent: Sep. 7, 2021

(54) METHOD FOR OBTAINING RADIO CAPABILITY INFORMATION OF TERMINAL, CORE NETWORK ENTITY, BASE STATION, AND TERMINAL

(71) Applicant: HUAWEI TECHNOLOGIES CO., LTD., Shenzhen (CN)

(72) Inventors: Hui Jin, Beijing (CN); Guowei Ouyang, Beijing (CN); Xiaoyan Duan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/310,445

(22) PCT Filed: Jun. 17, 2016

(86) PCT No.: PCT/CN2016/086207
§ 371 (c)(1),
(2) Date: Dec. 16, 2018

(87) PCT Pub. No.: WO2017/214975
PCT Pub. Date: Dec. 21, 2017

(65) Prior Publication Data
US 2019/0327653 A1    Oct. 24, 2019

(51) Int. Cl.
*H04W 36/00*    (2009.01)
*H04W 92/14*    (2009.01)
*H04W 92/18*    (2009.01)

(52) U.S. Cl.
CPC ....... *H04W 36/03* (2018.08); *H04W 36/0016* (2013.01); *H04W 36/0033* (2013.01); *H04W 92/14* (2013.01); *H04W 92/18* (2013.01)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 9,820,203 B1 * 11/2017 Oroskar .............. H04W 36/165
9,949,195 B1 *  4/2018 Oroskar ........... H04W 36/0077
(Continued)

FOREIGN PATENT DOCUMENTS

CN     101873576 A    10/2010
CN     102792720 A    11/2012
(Continued)

*Primary Examiner* — Brenda H Pham
(74) *Attorney, Agent, or Firm* — Maier & Maier, PLLC

(57) ABSTRACT

Embodiments of the present invention relate to a method for obtaining radio capability information of a terminal, a core network entity, a base station, and a terminal. When a first terminal changes from a first communication path for the first terminal to directly access a network to a second communication path for the first terminal to access the network by using a second terminal, the first terminal receives a first message that is sent by a base station to obtain radio capability information of the first terminal; and then sends the radio capability information of the first terminal to the base station, where the radio capability information includes information about a manner of connection between the first terminal and the second terminal and identification information of the second terminal.

7 Claims, 15 Drawing Sheets

(58) Field of Classification Search
CPC ..... H04W 84/18; H04W 36/30; H04W 36/24; H04W 74/08
USPC ............ 370/310.2, 328, 331, 332, 338
See application file for complete search history.

(56) References Cited

U.S. PATENT DOCUMENTS

| | | | |
|---|---|---|---|
| 2008/0285504 A1* | 11/2008 | Lin | H04B 7/15557 370/319 |
| 2011/0134827 A1* | 6/2011 | Hooli | H04W 72/04 370/315 |
| 2011/0249558 A1* | 10/2011 | Raaf | H04B 7/2606 370/237 |
| 2013/0010701 A1* | 1/2013 | Uchiyama | H04W 8/22 370/328 |
| 2013/0084795 A1* | 4/2013 | Van Phan | H04B 7/15592 455/15 |
| 2013/0287012 A1 | 10/2013 | Pragada et al. | |
| 2013/0288668 A1 | 10/2013 | Pragada et al. | |
| 2014/0146746 A1* | 5/2014 | Forsman | H04W 88/18 370/328 |
| 2014/0204847 A1 | 7/2014 | Belleschi et al. | |
| 2014/0256334 A1 | 9/2014 | Kazmi et al. | |
| 2014/0349579 A1* | 11/2014 | Zhou | H04W 12/06 455/41.2 |
| 2015/0133112 A1* | 5/2015 | Wang | H04W 76/14 455/426.1 |
| 2015/0271733 A1 | 9/2015 | Li et al. | |
| 2015/0305070 A1 | 10/2015 | Ahmad | |
| 2016/0029423 A1 | 1/2016 | Ke et al. | |
| 2016/0198518 A1 | 7/2016 | Baek et al. | |
| 2016/0295494 A1* | 10/2016 | Gulati | H04B 7/15507 |
| 2016/0381550 A1 | 12/2016 | Fodor et al. | |
| 2017/0019822 A1 | 1/2017 | Zhao et al. | |
| 2018/0359790 A1* | 12/2018 | Ingale | H04W 72/048 |

FOREIGN PATENT DOCUMENTS

| | | |
|---|---|---|
| CN | 103731090 A | 5/2014 |
| CN | 104066200 A | 9/2014 |
| CN | 104105086 A | 10/2014 |
| CN | 104272707 A | 1/2015 |
| CN | 104303582 A | 1/2015 |
| CN | 104427489 A | 3/2015 |
| CN | 104770051 A | 7/2015 |
| CN | 104936164 A | 9/2015 |
| CN | 105009676 A | 10/2015 |
| CN | 105075386 A | 11/2015 |
| CN | 105122886 A | 12/2015 |
| CN | 105228218 A | 1/2016 |
| WO | 2014175149 A1 | 10/2014 |
| WO | 2015030557 A1 | 3/2015 |
| WO | 2015142431 A1 | 9/2015 |
| WO | 2016025548 A1 | 2/2016 |

* cited by examiner

METHOD FOR OBTAINING RADIO CAPABILITY INFORMATION OF TERMINAL, CORE NETWORK ENTITY, BASE STATION, AND TERMINAL

CROSS-REFERENCE TO RELATED APPLICATIONS

This application is a national stage of International Application No. PCT/CN2016/086207, filed on Jun. 17, 2016, which is hereby incorporated by reference in its entirety.

TECHNICAL FIELD

The present invention relates to the wireless communications field, and in particular, to a method for obtaining radio capability information of a terminal, a core network entity, a base station, and a terminal.

BACKGROUND

Today's smartphone industry has matured, and the market is becoming saturated. The access network market and the data card market have declined, and a wearable device is one of future strategic directions of various companies. Currently, the industry has launched a watch on which a subscriber identity module (English: subscriber identity module, SIM) card may be installed, so that the watch can be directly connected to a network. Due to limitation of a volume of the wearable device, a battery and an antenna of the wearable device are main problems that affect the wearable device: A battery capacity is small, and direct communication with a base station network results in fast battery consumption and a short standby time; and the wearable device is generally in a special shape, antenna design is difficult, and only a single antenna can be implemented currently. Therefore, compared with a multi-antenna device such as a mobile phone terminal, the wearable device needs to take more time and consume more network resources to send a same amount of data. Currently, there is always a high-performance mobile phone around the wearable device. A solution in which the wearable device is connected to the network by using the mobile phone may be used, to reduce power consumption of the wearable device, and manage a radio capability, such as quality of service, of the wearable device.

In the prior art, after a terminal accesses a network, a network side sets optimal network side QoS for the terminal based on an access technology type RAT type, such as an evolved universal terrestrial radio access network (English: Evolved Universal Terrestrial Radio Access Network, EUTRAN), a UMTS Terrestrial Radio Access Network (English: UMTS Terrestrial Radio Access Network, UTRAN), and a GSM/EDGE radio access network (English: GSM EDGE Radio Access Network, GERAN), used by the terminal. However, when the wearable device changes between two modes: independently accessing a network and accessing the network by using the relay terminal, because the wearable device does not notify the network that a network access capability of the wearable device changes, the network side cannot provide the wearable device with optimal QoS based on an access manner of the wearable device. QoS is a network security mechanism in which a network can use various basic technologies to provide specified network communication with a better service capability, and is a technology capable of resolving problems such as network latency and congestion.

It can be learned that, in the prior art, the network cannot provide the wearable device with an optimal transmission rate based on the access manner of the wearable device. In other words, the network cannot provide the wearable device with optimal QoS based on the access manner of the wearable device.

SUMMARY

Embodiments of the present invention provide a method for obtaining radio capability information of a terminal, a core network entity, a base station, and a terminal, so that after the terminal changes a network access manner, a network side can determine available QoS for the terminal.

According to a first aspect, a method for obtaining radio capability information of a terminal is provided. The method includes: when a first terminal changes from a first communication path to a second communication path, receiving, by the first terminal, a first message sent by a base station, where the first communication path is a communication path for the first terminal to directly access a network, the second communication path is a communication path for the first terminal to access the network by using a second terminal, the first message is used to obtain radio capability information of the first terminal, and the first message may be an S1-AP initial context setup request (S1-AP initial context setup request) message, to instruct the eNB to obtain radio capability information of the first terminal on the second communication path; and then, sending, by the first terminal, the radio capability information of the first terminal to the base station, where the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMSI identity of the relay terminal, the C-RNTI is a temporary identifier allocated by the eNB to the relay terminal, the S-TMSI is a temporary identifier allocated by an MME to the relay terminal, and the information about the connection manner is used to describe a near field communication technology used for connection between the second terminal and the first terminal, and includes but is not limited to LTE D2D, Bluetooth (Bluetooth), and a wireless local area network (English: Wireless Fidelity, WiFi).

In an optional implementation, before the sending, by the first terminal, radio capability information of the first terminal to the base station based on the first message, the method further includes: obtaining, by the first terminal based on a received capability request message sent by the base station, the information about the manner of connection between the first terminal and the second terminal and the identification information of the second terminal, where the identification information may be a C-RNTI or an S-TMS of the second terminal, and the information about the connection manner is used to describe a near field communication technology used for connection between the second terminal and the first terminal, and includes but is not limited to LTE D2D, Bluetooth (Bluetooth), and a wireless local area network (English: Wireless Fidelity, WiFi).

In an optional implementation, before the receiving, by the first terminal, a first message sent by a base station, the method further includes: sending, by the first terminal, a second message to an MME, where the second message may be a tracking area update request (TAU request) message, and the second message includes capability update indication information and access path indication information of the first terminal, so that the MME determines, based on the update indication information of the first terminal, that a network access manner of the first terminal changes, and the MME sends a third message to the base station, and then determines, based on the access path indication information of the first terminal, that the first terminal changes from the first communication path to the second communication path.

According to a second aspect, a method for obtaining radio capability information of a terminal is provided. The method includes: when a first terminal changes from a first communication path to a second communication path, sending, by a core network entity MME, a first message to a base station, where the first message may be an S1-AP initial context setup request message, the first communication path is a communication path for the first terminal to directly access a network, the second communication path is a communication path for the first terminal to access the network by using a second terminal, and the first message is used to trigger the base station to obtain radio capability information of the first terminal from the first terminal; and then, receiving, by the MME, a second message sent by the base station, where the second message may be a terminal capability information indication (UE capability info indication) message, the second message includes the radio capability information of the first terminal, and the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by the eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

In an optional implementation, before the sending, by a core network entity MME, a first message to a base station, the method further includes: receiving, by the MME, a third message sent by the first terminal, where the third message includes capability update indication information and access path indication information of the first terminal, and the third message may be a tracking area update request (TAU request) message; and then determining, by the MME based on the capability update indication information of the first terminal, that a network access manner of the first terminal changes, and determining, by the MME based on the access path indication information of the first terminal, that the first terminal changes from the first communication path to the second communication path.

In an optional implementation, after the MME obtains the radio capability information of the first terminal, the method further includes: sending, by the MME, a modify bearer request (modify bearer request) message to a PGW by using a gateway entity SGW, and sending an IP-CAN session modification (IP-CAN session modification) message to a PCRF by using the PGW, so that the MME sends attribute information of the second communication path to the PCRF, where the attribute information of the second communication path includes the information about the manner of connection between the first terminal and the second terminal and the identification information of the second terminal, so that the PCRF determines a PCC rule for the first terminal based on the information about the manner of connection between the first terminal and the second terminal and the identification information of the second terminal.

In an optional implementation, the attribute information of the second communication path further includes access network type RAT type information, so that the PCRF determines the PCC rule for the first terminal based on the information about a manner of connection between the first terminal and the second terminal, the identification information of the second terminal, and the access network type information. The RAT type information may be an access network type of an evolved universal terrestrial radio access network (English: Evolved Universal Terrestrial Radio Access Network, EUTRAN), and an identifier of the relay terminal may be an international mobile subscriber identity (English: International Mobile Subscriber Identification Number, IMSI).

According to a third aspect, a method for obtaining radio capability information of a terminal is provided. The method includes: when a first terminal changes from a first communication path to a second communication path, receiving, by a base station, a first message sent by an MME, where the first message may be an S1-AP initial context setup request message, the first communication path is a communication path for the first terminal to directly access a network, the second communication path is a communication path for the first terminal to access the network by using a second terminal, and the first message is used to obtain radio capability information of the first terminal; receiving, by the base station from the first terminal, an RRC terminal capability (RRC UE capability information) message that carries the radio capability information of the first terminal; and then, sending, by the base station, a second message to the MME, where the second message may be a terminal capability information indication (UE capability info indication) message, and the second message includes the radio capability information of the first terminal, so that the MME obtains the radio capability information of the first terminal, where the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by the eNB to the relay terminal, the S-TMSI is a temporary identifier allocated by an MME to the relay terminal, and the information about the connection manner is used to describe a near field communication technology used for connection between the second terminal and the first terminal, and includes but is not limited to LTE D2D, Bluetooth (Bluetooth), and a wireless local area network (English: Wireless Fidelity, WiFi).

In an optional implementation, when the radio capability information of the first terminal includes the information about the manner of connection between the first terminal and the second terminal and the identification information of the second terminal, after the obtaining, by the base station, the radio capability information of the first terminal from the first terminal based on the first message, the method further includes: obtaining, by the base station, the radio capability information of the second terminal based on the identification information of the second terminal; and then determining, by the base station based on the radio capability information of the second terminal and the information about the manner of connection between the first terminal and the second terminal, quality of service of a radio bearer used by the first terminal.

In an optional implementation, the obtaining, by the base station, the radio capability information of the first terminal from the first terminal is specifically: sending, by the base station, a third message to the first terminal, where the third message may be an RRC UE capability enquiry (RRC UE capability enquiry) message; and receiving, by the base station, the radio capability information of the first terminal that is sent by the first terminal based on the third message.

According to a fourth aspect, a method for obtaining radio capability information of a terminal is provided. The method includes: when a first terminal changes from a first communication path to a second communication path, obtaining, by the first terminal, information about a manner of connection between the first terminal and a second terminal and identification information of the second terminal, where the first communication path is a communication path for the first terminal to directly access a network, and the second communication path is a communication path for the first terminal to access the network by using a second terminal; and sending, by the first terminal, a first message to an MME, where the first message may be a service request (service request) message, the first message includes radio capability information of the first terminal, and the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by an eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

In an optional implementation, the method further includes: obtaining, by the first terminal, the radio capability information of the second terminal based on the identification information of the second terminal, where the radio capability information of the first terminal includes the information about the manner of connection between the first terminal and the second terminal and the radio capability information of the second terminal.

According to a fifth aspect, a method for obtaining radio capability information of a terminal is provided. The method includes: when a first terminal changes from a first communication path to a second communication path, receiving, by an MME, a first message sent by the first terminal, where the first message may be a service request (service request) message, the first communication path is a communication path for the first terminal to directly access a network, the second communication path is a communication path for the first terminal to access the network by using a second terminal, and the first message includes radio capability information of the first terminal; and sending, by the MME, a second message to a base station, where the second message may be an S1-AP initial context setup request message, and the second message includes the radio capability information of the first terminal, so that the base station obtains the radio capability information of the first terminal, where the radio capability information of the first terminal includes information about a manner of connection between the first terminal and the second terminal and identification information of the second terminal; or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by the eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

In an optional implementation, when the radio capability information of the first terminal includes the information about the manner of connection between the first terminal and the second terminal and the identification information of the second terminal, after the receiving, by an MME, a first message sent by the first terminal, the method further includes: comparing, by the MME, the information about the connection manner and the identification information of the second terminal respectively with connection manner information and identification information that are stored by the MME; and if the information about the connection manner and the identification information of the second terminal are respectively different from the connection manner information and the identification information that are stored by the MME, or if at least one of the information about the connection manner and the identification information of the second terminal is different from the connection manner information and the identification information that are stored by the MME, sending, by the MME, a modify bearer request (modify bearer request) message to a PGW by using a gateway entity SGW, and sending an IP-CAN session modification (IP-CAN session modification) message to a PCRF by using the PGW, so that the MME sends attribute information of the second communication path to the PCRF, where the attribute information of the second communication path includes the information about the manner of connection between the first terminal and the second terminal and the identification information of the second terminal, so that the PCRF determines a PCC rule for the first terminal based on the information about the manner of connection between the first terminal and the second terminal and the identification information of the second terminal.

In an optional implementation, when the radio capability information of the first terminal includes the information about the manner of connection between the first terminal and the second terminal and the identification information of the second terminal, after the receiving, by an MME, a first message sent by the first terminal, the method further includes: comparing, by the MME, the information about the connection manner and the identification information of the second terminal respectively with connection manner information and identification information that are stored by the MME; and if the current information about the connection manner and identification information of the second terminal are respectively the same as the connection manner information and the identification information that are stored by the MME, it indicates that the first terminal keeps working on the second communication path, that is, the first terminal always accesses the network by using the relay terminal. In this case, the procedure ends, and QoS determined by a current network side is still used.

In an optional implementation, the attribute information of the second communication path further includes access network type information, so that the PCRF determines the PCC rule for the first terminal based on the information about the manner of connection between the first terminal and the second terminal, the identification information of the second terminal, and the access network type information.

According to a sixth aspect, a method for obtaining radio capability information of a terminal is provided. The method includes: when a first terminal changes from a first communication path to a second communication path, receiving, by a base station, a first message sent by an MME, where the first message may be an S1-AP initial context setup request message, the first communication path is a communication path for the first terminal to directly access a network, the second communication path is a communication path for the first terminal to access the network by using a second terminal, the first message includes radio capability information of the first terminal, and the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by the eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

In an optional implementation, when the radio capability information of the first terminal includes the information about the manner of connection between the first terminal and the second terminal and the identification information of the second terminal, the base station obtains the radio capability information of the second terminal based on the identification information of the second terminal, and then, the base station determines, based on the radio capability information of the second terminal and the information about the connection between the first terminal and the second terminal, quality of service of a radio bearer used by the first terminal.

According to a seventh aspect, a method for obtaining radio capability information of a terminal is provided. The method includes: when a first terminal changes from a second communication path to a first communication path, sending, by the first terminal, a first message to an MME, where the first message may be a service request (service request) message or a tracking area update request (TAU request) message, the first communication path is a communication path for the first terminal to directly access a network, the second communication path is a communication path for the first terminal to access the network by using a second terminal, the first message is used to obtain radio capability information of the first terminal, and the first message includes access path indication information of the first terminal, so that the MME deletes, based on the access path indication information, first radio capability information of the first terminal that is stored when the first terminal accesses the network by using the second communication path, and stores, based on the access path indication information, second radio capability information of the first terminal that is obtained when the first terminal accesses the network by using the first communication path. The identification information may be a C-RNTI or an S-TMS of the second terminal, the C-RNTI is a temporary identifier allocated by an eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

In an optional implementation, the first message further includes capability update indication information of the first terminal, where the capability update indication information is used to enable the MME to send a second message to a base station, the second message may be an S1-AP initial context setup request message, and the S1-AP initial context setup request message may include the access path indication information and the second radio capability information, so that the eNB obtains the second radio capability information.

According to an eighth aspect, a method for obtaining radio capability information of a terminal is provided. The method includes: when a first terminal changes from a second communication path to a first communication path, receiving, by an MME, a first message sent by the first terminal, where the first message may be a tracking area update request (TAU request) message or a service request (service request) message, the first communication path is a communication path for the first terminal to directly access a network, the second communication path is a communication path for the first terminal to access the network by using a second terminal, and the first message includes access path indication information of the first terminal; and deleting, by the MME based on the access path indication information, first radio capability information of the first terminal that is stored when the first terminal accesses the network by using the second communication path, and storing, based on the access path indication information, second radio capability information of the first terminal that is obtained when the first terminal accesses the network by using the first communication path.

In an optional implementation, the first message further includes capability update indication information of the first terminal, and the method further includes: sending, by the MME, a second message to a base station based on the capability update indication information of the first terminal, where the second message may be an S1-AP initial context setup request message, and the second message includes the access path indication information and the second radio capability information, so that the base station obtains the second radio capability information.

In an optional implementation, the method further includes: sending, by the MME, a third message to a base station based on the access path indication information, where the third message may be an S1-AP initial context setup request message, and the third message includes the second radio capability information, so that an objective that the base station obtains the second radio capability information is achieved again.

In an optional implementation, after the sending, by the MME, a second message to a base station, the method further includes: sending, by the MME, a modify bearer request (modify bearer request) message to a PGW by using a gateway entity SGW, and sending an IP-CAN session modification message to a PCRF by using the PGW, so that the MME sends attribute information of the second communication path to the PCRF, where the attribute information of the first communication path includes access network type information of the first terminal, so that the PCRF determines a PCC rule for the first terminal based on the access network type information of the first terminal.

According to a ninth aspect, a method for obtaining radio capability information of a terminal is provided. The method includes: when a first terminal changes from a second communication path to a first communication path, receiving, by a base station, a first message sent by an MME, where the first message may be an S1-AP initial context setup request message, the first message includes first radio capability information of the first terminal that is obtained when the first terminal accesses a network by using the first communication path, the first communication path is a communication path for the first terminal to directly access the network, the second communication path is a communication path for the first terminal to access the network by using a second terminal, and the first message is used to obtain radio capability information of the first terminal.

In an optional implementation, the first message further includes access path indication information of the first terminal, and the method further includes: deleting, by the base station based on the access path indication information of the first terminal, first radio capability information of the first terminal that is stored when the first terminal accesses the network by using the second communication path.

According to a tenth aspect, a terminal is provided. The terminal has functions for implementing actual behavior of the terminal in the method of the first aspect. The functions may be implemented by using hardware, or implemented by executing corresponding software by hardware. The hardware or software includes one or more functional modules corresponding to the foregoing functions.

According to an eleventh aspect, an MME is provided. The MME has functions for implementing actual behavior of the terminal in the method of the second aspect. The functions may be implemented by using hardware, or implemented by executing corresponding software by hardware. The hardware or software includes one or more functional modules corresponding to the foregoing functions.

According to a twelfth aspect, a base station is provided. The base station has functions for implementing actual behavior of the terminal in the method of the third aspect. The functions may be implemented by using hardware, or implemented by executing corresponding software by hardware. The hardware or software includes one or more functional modules corresponding to the foregoing functions.

According to a thirteenth aspect, another terminal is provided. The terminal has functions for implementing actual behavior of the terminal in the method of the fourth aspect. The functions may be implemented by using hardware, or implemented by executing corresponding software by hardware. The hardware or software includes one or more functional modules corresponding to the foregoing functions.

According to a fourteenth aspect, another MME is provided. The MME has functions for implementing actual behavior of the terminal in the method of the fifth aspect. The functions may be implemented by using hardware, or implemented by executing corresponding software by hardware. The hardware or software includes one or more functional modules corresponding to the foregoing functions.

According to a fifteenth aspect, another base station is provided. The base station has functions for implementing actual behavior of the terminal in the method of the sixth aspect. The functions may be implemented by using hardware, or implemented by executing corresponding software by hardware. The hardware or software includes one or more functional modules corresponding to the foregoing functions.

According to a sixteenth aspect, still another terminal is provided. The terminal has functions for implementing actual behavior of the terminal in the method of the seventh aspect. The functions may be implemented by using hardware, or implemented by executing corresponding software by hardware. The hardware or software includes one or more functional modules corresponding to the foregoing functions.

According to a seventeenth aspect, still another MME is provided. The MME has functions for implementing actual behavior of the terminal in the method of the eighth aspect. The functions may be implemented by using hardware, or implemented by executing corresponding software by hardware. The hardware or software includes one or more functional modules corresponding to the foregoing functions.

According to an eighteenth aspect, still another base station is provided. The base station has functions for implementing actual behavior of the terminal in the method of the ninth aspect. The functions may be implemented by using hardware, or implemented by executing corresponding software by hardware. The hardware or software includes one or more functional modules corresponding to the foregoing functions.

According to a nineteenth aspect, yet another terminal is provided. When a first terminal changes from a first communication path to a second communication path, where the first communication path is a communication path for the first terminal to directly access a network, and the second communication path is a communication path for the first terminal to access the network by using a second terminal, the terminal includes a receiver and a transmitter. The receiver is configured to receive a first message sent by a base station, where the first message may be an S1-AP initial context setup request message, to instruct the eNB to obtain radio capability information of the first terminal on the second communication path, and the first message is used to obtain radio capability information of the first terminal. The transmitter is configured to send the radio capability information of the first terminal to the base station, where the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMSI identity of the relay terminal, the C-RNTI is a temporary identifier allocated by the eNB to the relay terminal, the S-TMSI is a temporary identifier allocated by an MME to the relay terminal, and the information about the connection manner is used to describe a near field communication technology used for connection between the second terminal and the first terminal, and includes but is not limited to LTE D2D, Bluetooth (Bluetooth), and a wireless local area network (English: Wireless Fidelity, WiFi).

The terminal may further include a memory and a processor. The memory is configured to be coupled with the processor, and store a necessary program instruction and necessary data of the terminal. The processor is configured to support the terminal in performing a corresponding function in the method of the first aspect.

According to a twentieth aspect, yet another MME is provided. When a first terminal changes from a first communication path to a second communication path, where the first communication path is a communication path for the first terminal to directly access a network, and the second communication path is a communication path for the first terminal to access the network by using a second terminal, the MME includes a receiver and a transmitter. The transmitter is configured to send a first message to a base station, where the first message may be an S1-AP initial context setup request message, and the first message is used to trigger the base station to obtain radio capability information of the first terminal from the first terminal. The receiver is configured to receive a second message sent by the base station, where the second message includes the radio capability information of the first terminal, the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by the eNB to the relay terminal, the S-TMSI is a temporary identifier allocated by the MME to the relay terminal, and the information about the connection manner is used to describe a near field communication technology used for connection between the second terminal and the first terminal, and includes but is not limited to LTE D2D, Bluetooth (Bluetooth), and a wireless local area network (English: Wireless Fidelity, WiFi).

The MME may further include a memory and a processor. The memory is configured to be coupled with the processor, and store a necessary program instruction and necessary data of the MME. The processor is configured to support the MME in performing a corresponding function in the method of the second aspect.

According to a twenty-first aspect, yet another base station is provided. When a first terminal changes from a first communication path to a second communication path, where the first communication path is a communication path for the first terminal to directly access a network, and the second communication path is a communication path for the first terminal to access the network by using a second terminal, the base station includes: a receiver, configured to receive a first message sent by an MME, where the first message is used to obtain radio capability information of the first terminal; a processor, configured to obtain the radio capability information of the first terminal from the first terminal; and a transmitter, configured to send a second message to the MME, where the second message includes the radio capability information of the first terminal, so that the MME obtains the radio capability information of the first terminal, where the radio capability information of the first terminal includes the information about a manner of connection between the first terminal and the second terminal and identification information of the second terminal, or the radio capability information of the first terminal includes information about a manner of connection between the first terminal and the second terminal and radio capability information of the second terminal.

The base station may further include a memory. The memory is configured to be coupled with the processor, and store a necessary program instruction and necessary data of the base station.

According to a twenty-second aspect, yet another terminal is provided. When a first terminal changes from a first communication path to a second communication path, where the first communication path is a communication path for the first terminal to directly access a network, and the second communication path is a communication path for the first terminal to access the network by using a second terminal, the terminal includes a processor and a transmitter. The processor is configured to obtain information about a manner of connection between the first terminal and the second terminal and identification information of the second terminal. The transmitter is configured to send a first message to an MME, where the first message may be a service request (service request) message, the first message includes radio capability information of the first terminal, and the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by an eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

The terminal may further include a memory. The memory is configured to be coupled with the processor, and store a necessary program instruction and necessary data of the terminal.

According to a twenty-third aspect, yet another MME is provided. When a first terminal changes from a first communication path to a second communication path, where the first communication path is a communication path for the first terminal to directly access a network, and the second communication path is a communication path for the first terminal to access the network by using a second terminal, the core network entity includes a receiver and a transmitter. The receiver is configured to receive a first message sent by the first terminal, where the first message may be a service request (service request) message, and the first message includes radio capability information of the first terminal. The transmitter is configured to send a second message to a base station, where the second message includes the radio capability information of the first terminal, so that base station obtains the radio capability information of the first terminal, where the radio capability information of the first terminal includes information about a manner of connection between the first terminal and the second terminal and identification information of the second terminal; or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by the eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

The MME may further include a memory and a processor. The memory is configured to be coupled with the processor, and store a necessary program instruction and necessary data of the MME. The processor is configured to support the MME in performing a corresponding function in the method of the fifth aspect.

According to a twenty-fourth aspect, yet another base station is provided. When a first terminal changes from a first communication path to a second communication path, where the first communication path is a communication path for the first terminal to directly access a network, and the second communication path is a communication path for the first terminal to access the network by using a second terminal, the base station includes a receiver. The receiver is configured to receive a first message sent by an MME, where the first message may be an S1-AP initial context setup request message, the first message includes radio capability information of the first terminal, and the radio capability information of the first terminal includes information about a manner of connection between the first terminal and the second terminal and identification information of the second terminal, or the radio capability information of the first terminal includes information about a manner of connection between the first terminal and the second terminal and radio capability information of the second terminal. The identification information may be a C-RNTI or an S-TMS of the second terminal, the C-RNTI is a temporary identifier allocated by the eNB to the relay terminal, the S-TMSI is a temporary identifier allocated by an MME to the relay terminal, and the information about the connection manner is used to describe a near field communication technology used for connection between the second terminal and the first terminal, and includes but is not limited to LTE D2D, Bluetooth (Bluetooth), and a wireless local area network (English: Wireless Fidelity, WiFi).

The base station may further include a memory, a receiver, and a processor. The memory is configured to be coupled with the processor, and store a necessary program instruction and necessary data of the base station. The receiver and the processor are configured to support the base station in performing a corresponding function in the method of the sixth aspect.

According to a twenty-fifth aspect, yet another terminal is provided. When a first terminal changes from a second communication path to a first communication path, where the first communication path is a communication path for the first terminal to directly access a network, and the second communication path is a communication path for the first terminal to access the network by using a second terminal, the terminal includes a transmitter. The transmitter is configured to send a first message to an MME, where the first message may be a service request (service request) message or a tracking area update request (TAU request) message, and the first message includes access path indication information of the first terminal, so that the MME deletes, based on the access path indication information, first radio capability information of the first terminal that is stored when the first terminal accesses the network by using the second communication path, and stores, based on the access path indication information, second radio capability information of the first terminal that is obtained when the first terminal accesses the network by using the first communication path. The identification information may be a C-RNTI or an S-TMS of the second terminal, the C-RNTI is a temporary identifier allocated by an eNB to the relay terminal, the S-TMSI is a temporary identifier allocated by the MME to the relay terminal, and the information about the connection manner is used to describe a near field communication technology used for connection between the second terminal and the first terminal, and includes but is not limited to, LTE D2D, Bluetooth (Bluetooth), and a wireless local area network (English: Wireless Fidelity, WiFi).

The terminal may further include a memory, a receiver, and a processor. The memory is configured to be coupled with the processor, and store a necessary program instruction and necessary data of the terminal. The receiver and the processor are configured to support the terminal in performing a corresponding function in the method of the seventh aspect.

According to a twenty-sixth aspect, yet another MME is provided. When a first terminal changes from a second communication path to a first communication path, where the first communication path is a communication path for the first terminal to directly access a network, and the second communication path is a communication path for the first terminal to access the network by using a second terminal, the MME includes a receiver and a processor. The receiver is configured to receive a first message sent by the first terminal, where the first message may be a tracking area update request message or a service request message, and the first message includes access path indication information of the first terminal. The processor is configured to delete, based on the access path indication information received by the receiver, first radio capability information of the first terminal that is stored when the first terminal accesses the network by using the second communication path, and store, based on the access path indication information received by the receiver, second radio capability information of the first terminal that is obtained when the first terminal accesses the network by using the first communication path.

The MME may further include a memory and a transmitter. The memory is configured to be coupled with the processor, and store a necessary program instruction and necessary data of the MME. The transmitter is configured to support the MME in performing a corresponding function in the method of the eighth aspect.

According to a twenty-seventh aspect, yet another base station is provided. When a first terminal changes from a second communication path to a first communication path, where the first communication path is a communication path for the first terminal to directly access a network, and the second communication path is a communication path for the first terminal to access the network by using a second terminal, the base station includes a receiver. The receiver is configured to receive a first message sent by an MME, where the first message may be an S1-AP initial context setup request message, the first message includes first radio capability information of the first terminal for accessing the network by using the first communication path, and the first message is used to obtain radio capability information of the first terminal.

The MME may further include a memory, a transmitter, and a processor. The memory is configured to be coupled with the processor, and store a necessary program instruction and necessary data of the MME. The transmitter and the processor are configured to support the MME in performing a corresponding function in the method of the ninth aspect.

According to yet another aspect, a computer storage medium is provided. The computer storage medium is configured to store a computer software instruction used by the foregoing devices. The computer software instruction includes a program designed for performing the foregoing aspects.

According to the method for obtaining radio capability information of a terminal, the core network entity, the base station, and the terminal provided in this application, when the first terminal changes between two modes: independently accessing a network and accessing the network by using the relay terminal, a network side can change radio access capability information of the first terminal based on an access manner of the first terminal, to set suitable quality of service for the first terminal, and provide the first terminal with an optimal transmission rate.

BRIEF DESCRIPTION OF DRAWINGS

To describe the technical solutions in embodiments of the present invention more clearly, the following briefly introduces the accompanying drawings required for describing the embodiments. Apparently, the accompanying drawings in the following description show merely some embodiments of the present invention, and a person of ordinary skill in the art may still derive another drawing from these accompanying drawings without creative efforts.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

Figure 1:
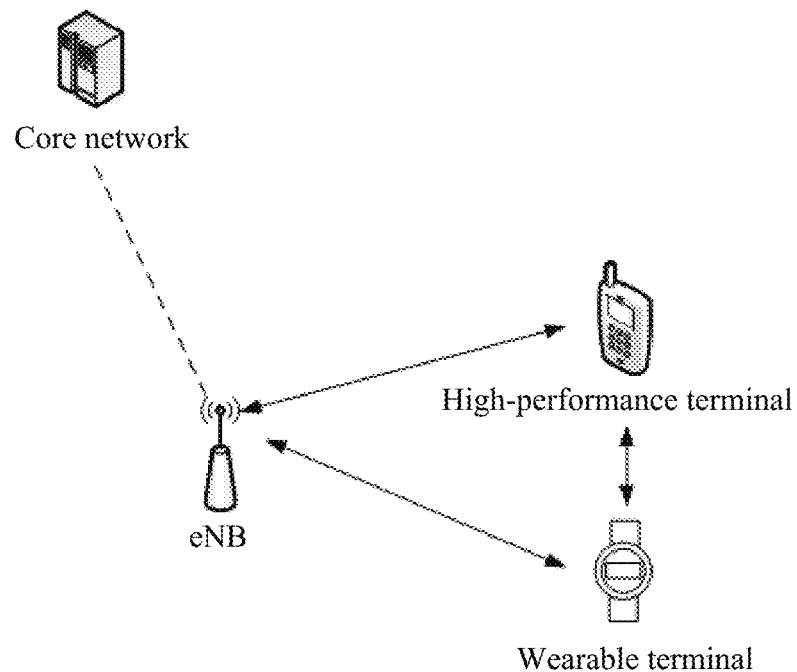
FIG. 1 is a schematic diagram of a network topology of a possible application scenario according to the present invention.

A quality of service management method provided in the present invention is applied to a diagram of a network topology shown in FIG. 1. A terminal accesses an IMS network by using a radio access network (English: Radio Access Network, RAN) and a core network (English: Core Network, CN). The technology described in the present invention is applicable to a Long Term Evolution (Long Term Evolution, LTE) system, or other wireless communications systems using various radio access technologies, for example, a system using an access technology such as Code Division Multiple Access, Frequency Division Multiple Access, Time Division Multiple Access, orthogonal frequency division multiple access, or single carrier frequency division multiple access, and is also applicable to a system subsequently evolved from the LTE system, such as a 5th-generation 5G system. For clarity, description is provided herein by using only the LTE system as an example. In the LTE system, an evolved UMTS terrestrial radio access (English: Evolved Universal Terrestrial Radio Access Network, E-UTRAN) is used as a radio access network, and an evolved packet core (English: Evolved Packet Core, EPC) is used as a core network. UE accesses the IMS network by using the E-UTRAN and the EPC.

In the present invention, the nouns "network" and "system" are often used interchangeably, but a person skilled in the art can understand meanings thereof. A terminal in this application may include various handheld devices, vehicle-mounted devices, wearable devices (English: wearable device, WD), and computing devices that have a wireless communication function, or other processing devices connected to a wireless modem, and various forms of user equipments (English: user equipment, UE), mobile stations (English: mobile station, MS), terminals (terminal), terminal equipments (English: terminal equipment), and the like. A base station (English: base station, BS) in the present invention is an apparatus that is deployed in a radio access network and that is configured to provide UE with a wireless communication function. The base station may include various forms of macro base stations, micro base stations, relay stations, access points, and the like. In systems using different radio access technologies, names of devices having functions of a base station may be different. For example, in an LTE network, the device may be referred to as an evolved NodeB (English: evolved NodeB, eNB or eNodeB), and in a 3rd-generation 3G network, the device may be referred to as a Node B (Node B). For convenience of description, in the present invention, the foregoing apparatuses providing the terminal with a wireless communication function are collectively referred to as base stations or BSs.

In FIG. 1, terminals include a wearable terminal and a high-performance terminal. The wearable terminal herein may be a portable device that is directly worn on a body, or a portable device integrated into clothing or an accessory of a user, for example, a watch, a wristband, glasses, or a helmet. The high-performance terminal is a terminal having higher performance relative to the wearable terminal, and may be user equipment such as a mobile phone or a notebook computer. The core network EPC may include a core network entity (such as a mobility management entity (English: mobility management entity, MME)), a gateway entity (such as a signaling gateway (English: Signaling GateWay, SGW), and a packet data network gateway (English: packet data network gateway, PDN GW or PGW)), and a policy and charging rules function (English: Policy and Charging Rule Function, PCRF) entity. The core network entity is mainly responsible for all control plane functions of user and session management, including NAS signaling and security, tracking area list (English: tracking area list, TAL) management, PGW and SGW selection, and the like. The SGW of the gateway entity is mainly responsible for transmitting and forwarding data of user equipment, routing switching, and the like, and serves as a local mobility anchoring point when the UE is handed over between eNBs (for each user equipment, only one SGW serves the user equipment at each moment). The PGW of the gateway entity serves as an anchoring point of PDN connection, and is responsible for allocating an IP address of the user equipment, filtering data packets of the user equipment, rate control, and generating charging information, and the like. The PCRF includes policy policy control decisions, and is configured to implement control over quality of service (English: quality of service, QoS).

Figure 2:
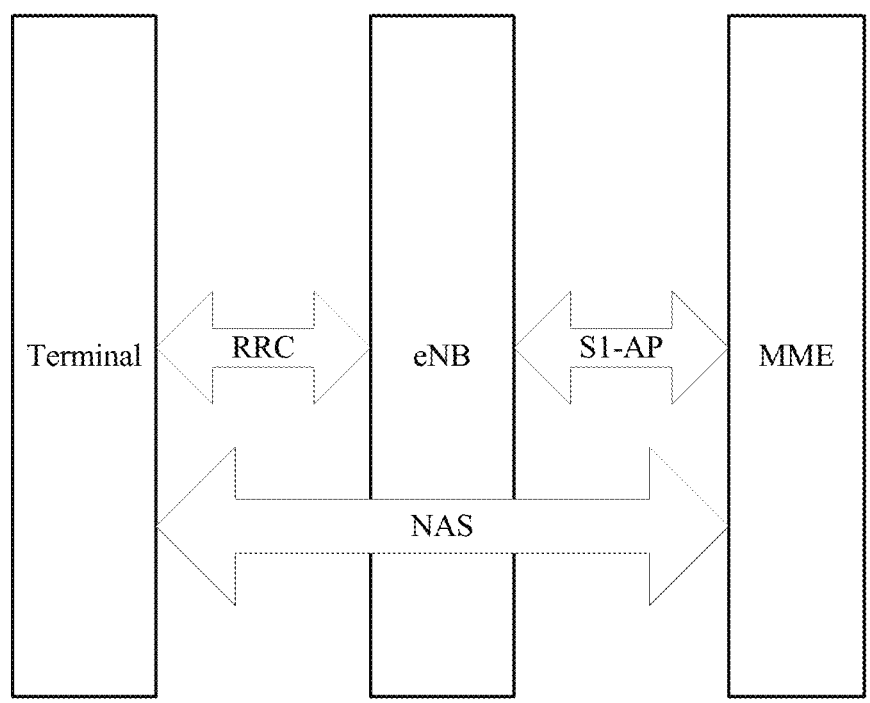
FIG. 2 is a schematic structural diagram of bearer information in a Long Term Evolution system according to the present invention.

As shown in FIG. 2, interactive signaling between a terminal, an eNB, and a core network entity MME in an LTE system includes but is not limited to NAS signaling, radio resource control (Radio Resource Control, RRC) signaling, and S1-AP signaling.

A bearer between the terminal and the eNB is managed by using the RRC signaling. To be specific, message exchange between the terminal and the eNB is performed by using the RRC signaling, to implement various functions such as setup, re-configuration, and release of a bearer. A bearer between the eNB and the MME is managed by using the S1-AP signaling, where the management includes setup, modification, and release of an S1 bearer, and there is dedicated S1-AP signaling for implementing functions of setup, modification, and release. A bearer between the terminal and the MME is managed by using the NAS signaling. To be specific, message exchange between the terminal and the MME is performed by using the NAS signaling.

In FIG. 1, when the wearable terminal changes from independently accessing a network to accessing the network by using the high-performance terminal, or when the wearable terminal changes from accessing a network by using the high-performance terminal to independently accessing the network, the wearable terminal may enable, by using a tracking area update (English: tracking area update, TAU) process or a service request (service request) process, the core network to learn that radio capability information changes due to an access manner change of the current wearable terminal, so that the core network sets a corresponding control policy to modify a bearer, and determines radio capability information, such as QoS, that is available after the wearable terminal accesses the network in the current manner. The radio capability information may be information such as a frequency band supported by the wearable terminal or an encryption manner of the accessed network.

The wearable terminal may be connected to the high-performance terminal by using a short range communications interface. A connection manner includes but is not limited to Bluetooth communication connection, device-to-device communication (English: device-to-device, D2D) connection, and radio communication connection.

It should be noted that, when the wearable terminal is moved from one tracking area (English: tracking area, TA) to another TA, a position needs to be registered again in the new TA, to instruct the core network to change terminal position information stored by the core network. This process is tracking area update TAU. The tracking area update TAU may be used to notify the EPC that the current terminal is available. The terminal executes a TAU program during handover between cells or when a tracking area identity (English: tracking area identity, TAI) is not in a TA list registered by the current UE.

The following describes the present invention in detail with reference to different scenarios by assuming that a first terminal is a wearable terminal and that a relay terminal is a high-performance terminal.

A path for the first terminal to directly access a network is a first communication path, that is, the first terminal is independently and directly connected to the network for communication without using another device. A path for the first terminal to access the network by using the relay terminal is a second communication path, that is, the first terminal is connected to the network for communication by using the relay terminal.

Figure 3A:
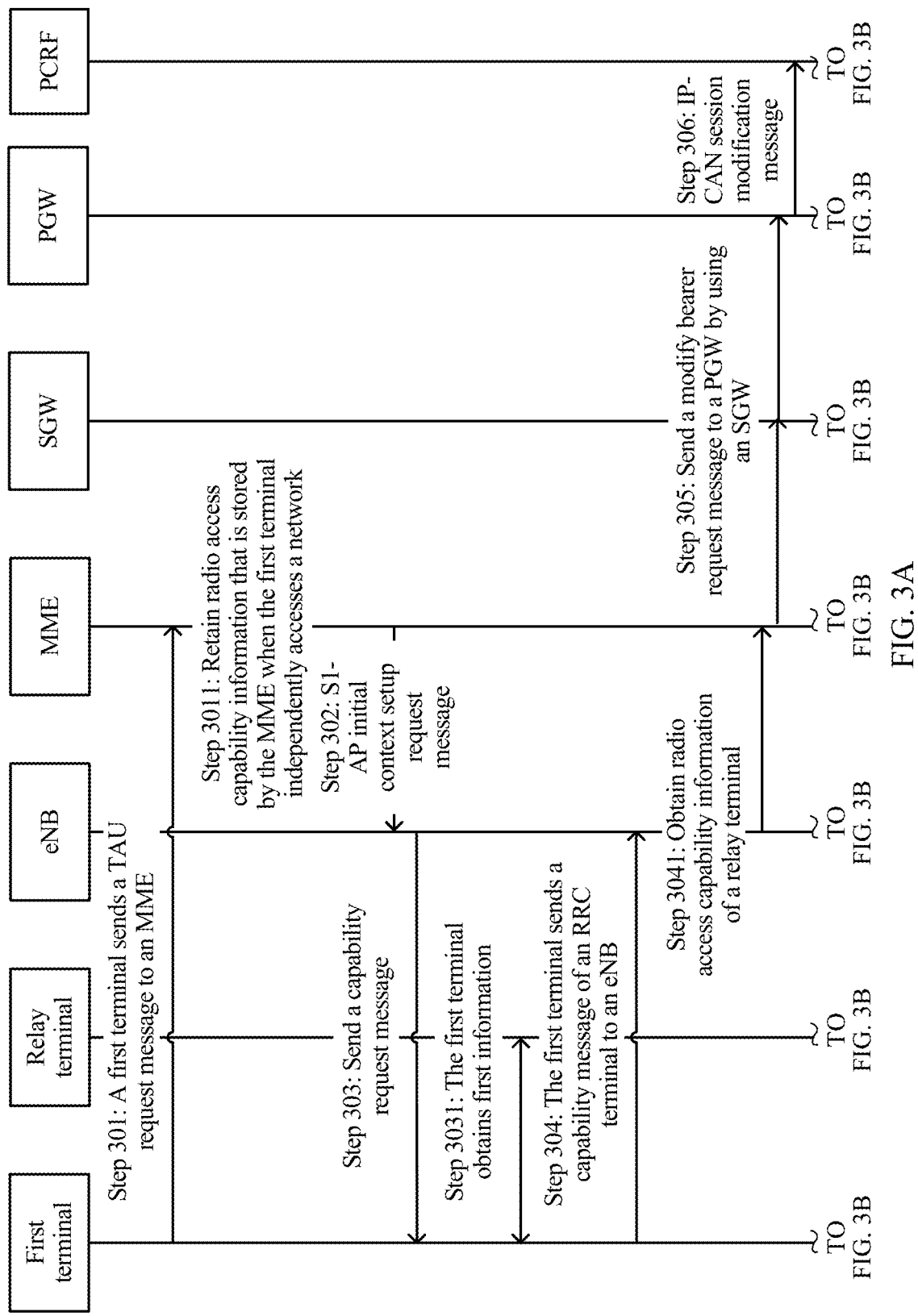
FIG. 3A and FIG. 3B are a first information interaction diagram of a method for obtaining radio capability information of a terminal according to an embodiment of the present invention.
Figure 3B:
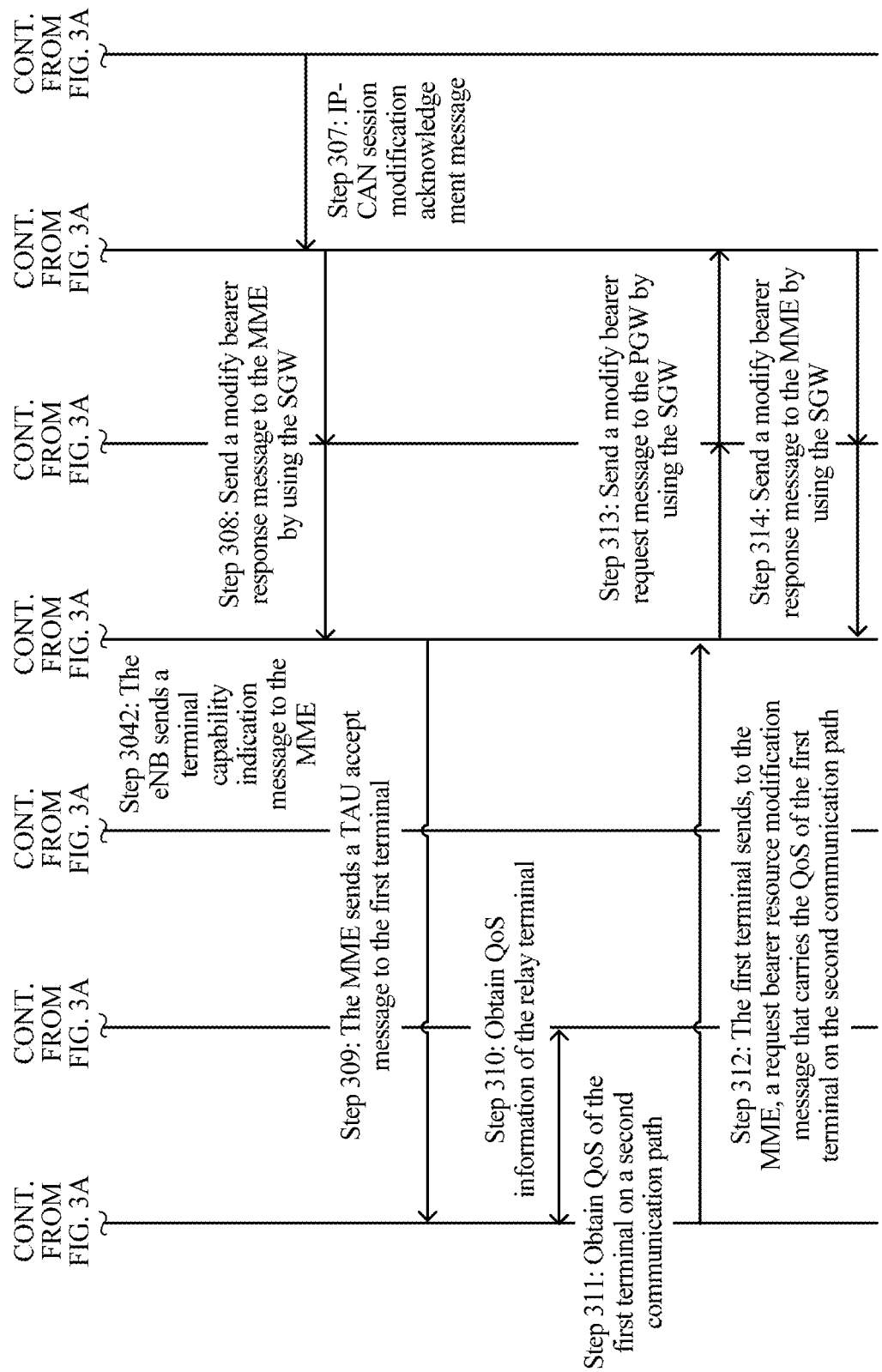

FIG. 3A and FIG. 3B are a first information interaction diagram of a method for obtaining radio capability information of a terminal according to an embodiment of the present invention. As shown in FIG. 3A and FIG. 3B, when a first terminal changes from a first path to a second communication path, the method may include the following steps.

Step 301: The first terminal sends a tracking area update request (TAU request) message to an MME, where the tracking area update request message includes capability update indication information and access path indication information of the first terminal.

The tracking area update request message is used to notify the MME of the capability update indication information and the access path indication information that are obtained after the first terminal changes from the first communication path to the second communication path.

Optionally, the MME determines, based on the access path indication information, that the first terminal changes from the first communication path to the second communication path, and retains radio capability information of the first terminal that is stored when the first terminal is on the first communication path; and the MME determines, based on the capability update indication information, that a network access manner of the first terminal changes.

Step 302: The MME sends a first message to an eNB, where the first message is used to trigger the eNB to obtain radio capability information of the first terminal from the first terminal.

The eNB and the MME perform message exchange by using S1-AP signaling, and the first message may be an S1-AP initial context setup request (S1-AP initial context setup request) message.

The MME sends the S1-AP initial context setup request message to the eNB based on the capability update indication information of the first terminal, to instruct the eNB to obtain radio capability information of the first terminal on the second communication path.

Step 303: The eNB sends a capability request message to the first terminal based on the first message sent by the MME, to obtain the radio capability information of the first terminal.

The capability request message may be an RRC UE capability enquiry (RRC UE capability enquiry) message.

Step 304: The first terminal sends the radio capability information of the first terminal to the eNB.

Before step 304 is performed, the first terminal obtains first information based on the received capability request message, where the first information includes identification information of a relay terminal and information about a manner of connection between the first terminal and the relay terminal, or radio capability information of a relay terminal and information about a manner of connection between the first terminal and the relay terminal.

The identification information of the relay terminal may be a C-RNTI or an S-TMSI of the relay terminal. The C-RNTI is a temporary identifier allocated by the eNB to the relay terminal, and is used between the relay terminal and the eNB. The S-TMSI is a temporary identifier allocated by the MME to the relay terminal, and is used between the relay terminal and the MME. The information about the manner of connection between the first terminal and the relay terminal is used to describe a near field communication technology used for connection between the relay terminal and the first terminal, and includes but is not limited to LTE D2D, Bluetooth (Bluetooth), and a wireless local area network (English: Wireless Fidelity, WiFi). WiFi may specifically include different supported 802.11 protocols.

The radio capability information of the first terminal includes the information about the manner of connection between the first terminal and the relay terminal and the identification information of the relay terminal, or the radio capability information of the first terminal includes the information about the manner of connection between the first terminal and the relay terminal and the radio capability information of the relay terminal.

The first terminal may send an RRC terminal capability (RRC UE capability information) message to the eNB, where the RRC UE capability information message carries the radio capability information of the first terminal.

In an example, the information, side link category, about the manner of connection between the relay terminal and the first terminal may be expressed as: side link category=1 indicates LTE D2D; side link category=2 indicates Bluetooth; and side link category=3 indicates WiFi.

Optionally, when the radio capability information of the first terminal includes the information about the manner of connection between the first terminal and the relay terminal and the identification information of the relay terminal, the eNB obtains the radio capability information of the relay terminal based on the identification information of the relay terminal.

Optionally, the eNB determines, based on the radio capability information of the relay terminal and the information about the manner of connection between the first terminal and the relay terminal, maximum quality of service of a radio bearer used by the first terminal.

It should be noted that, step 301 to step 304 may be understood as that the eNB obtains the radio capability information of the first terminal on the second communication path.

Step 307: The eNB sends the radio capability information of the first terminal to the MME, so that the MME obtains the radio capability information of the first terminal.

The eNB may send, to the MME, a terminal capability information indication (UE capability info indication) message that carries the radio capability information of the first terminal, so that the MME obtains the radio capability information of the first terminal.

If an identifier of the relay terminal carried in step 304 is the C-RNTI, the identifier of the relay terminal in this step is an MME UE S1-AP identifier. The MME UE S1-AP is a temporary identifier allocated by the MME to the relay terminal, and is used between the MME and the eNB. If an identifier of the relay terminal carried in step 304 is the S-TMSI, the identifier of the relay terminal in this step is the S-TMSI.

Further, the MME sends attribute information of the first communication path to a PCRF by using a gateway entity, where the attribute information of the first communication path may include access network type information of the first terminal, so that the PCRF determines a PCC rule for the first terminal based on the access network type information of the first terminal.

Optionally, the MME obtains, based on the received identification information of the relay terminal, access network type (English: radio access technology type, RAT Type) information of the first terminal for accessing the network by using the second communication path. The RAT type information may be an access network type of an evolved universal terrestrial radio access network (English: Evolved Universal Terrestrial Radio Access Network, EUTRAN), and the identifier of the relay terminal may be an international mobile subscriber identity (English: International Mobile Subscriber Identification Number, IMSI).

The MME sends a modify bearer request (modify bearer request) message to a PGW by using an SGW. The message may include but is not limited to the RAT type information, the information about the manner of connection between the first terminal and the relay terminal, and the identification information of the relay terminal.

The PGW sends an IP-CAN session modification (IP-CAN session modification) message to the PCRF. The message may include but is not limited to the RAT type information, the identification information of the relay terminal, and the information about the manner of connection between the first terminal and the relay terminal.

The PCRF makes a decision based on the RAT type information, the identification information of the relay terminal, and the information about the manner of connection between the first terminal and the relay terminal, configures a corresponding control policy (English: Policy Control and Charging, PCC) rule, and stores the PCC rule. The control policy is used to control QoS of the first terminal for accessing the network by using the second communication path.

The PCRF sends, to the PGW, an IP-CAN session modification acknowledgement (IP-CAN session modification ACK) message that carries the PCC rule. The message is used to instruct the PGW to perform end-to-end bearer resource management according to the PCC rule, for example, modify a data transmission rate by modifying a data channel.

The PGW sends a modify bearer response (modify bearer response) message to the MME by using the SGW, to notify the MME that bearer modification is completed.

The MME sends a tracking area update accept TAU accept message to the first terminal.

The first terminal obtains QoS capability information of the relay terminal, and determines QoS of the first terminal on the first communication path. It should be noted that, the process may also be performed in step 304. The first terminal determines, based on the QoS capability information of the relay terminal and the information about the manner of connection between the first terminal and the relay terminal, the QoS of the first terminal for accessing the network by using the second communication path, where the QoS is smaller than the maximum QoS obtained by the eNB.

The first terminal sends, to the MME, a request bearer resource modification (request bearer resource modification) message that carries the QoS of the first terminal on the second communication path.

The MME sends a modify bearer request message to the PGW by using the SGW. The message may include but is not limited to the RAT type information, the information about the manner of connection between the first terminal and the relay terminal, and the identification information of the relay terminal.

The PGW sends a modify bearer response message to the MME by using the SGW, to notify the MME that bearer modification is completed, so that the core network determines QoS that can be used by the first terminal.

Figure 4A:
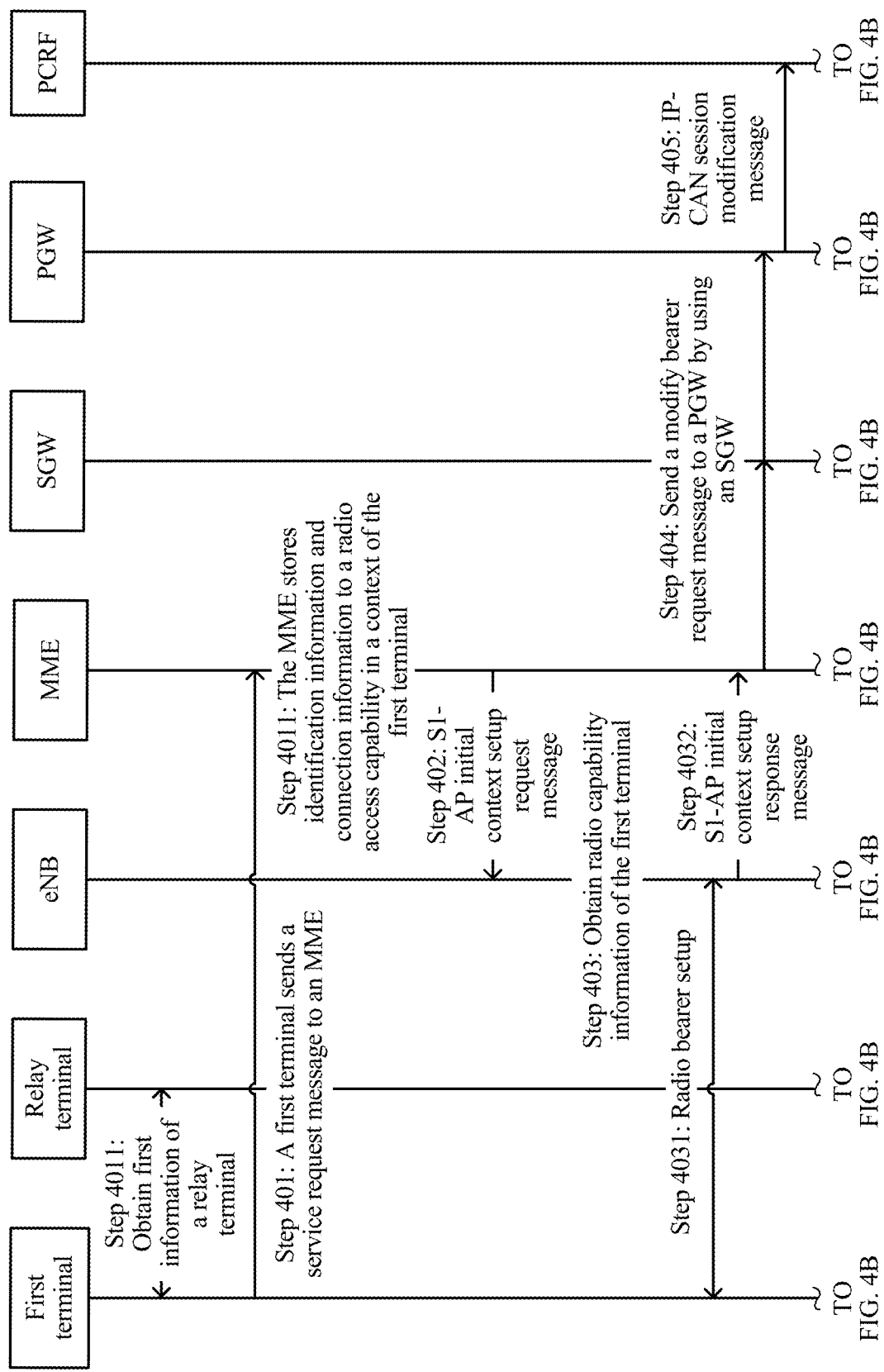
FIG. 4A and FIG. 4B are a second information interaction diagram of a method for obtaining radio capability information of a terminal according to an embodiment of the present invention.
Figure 4B:
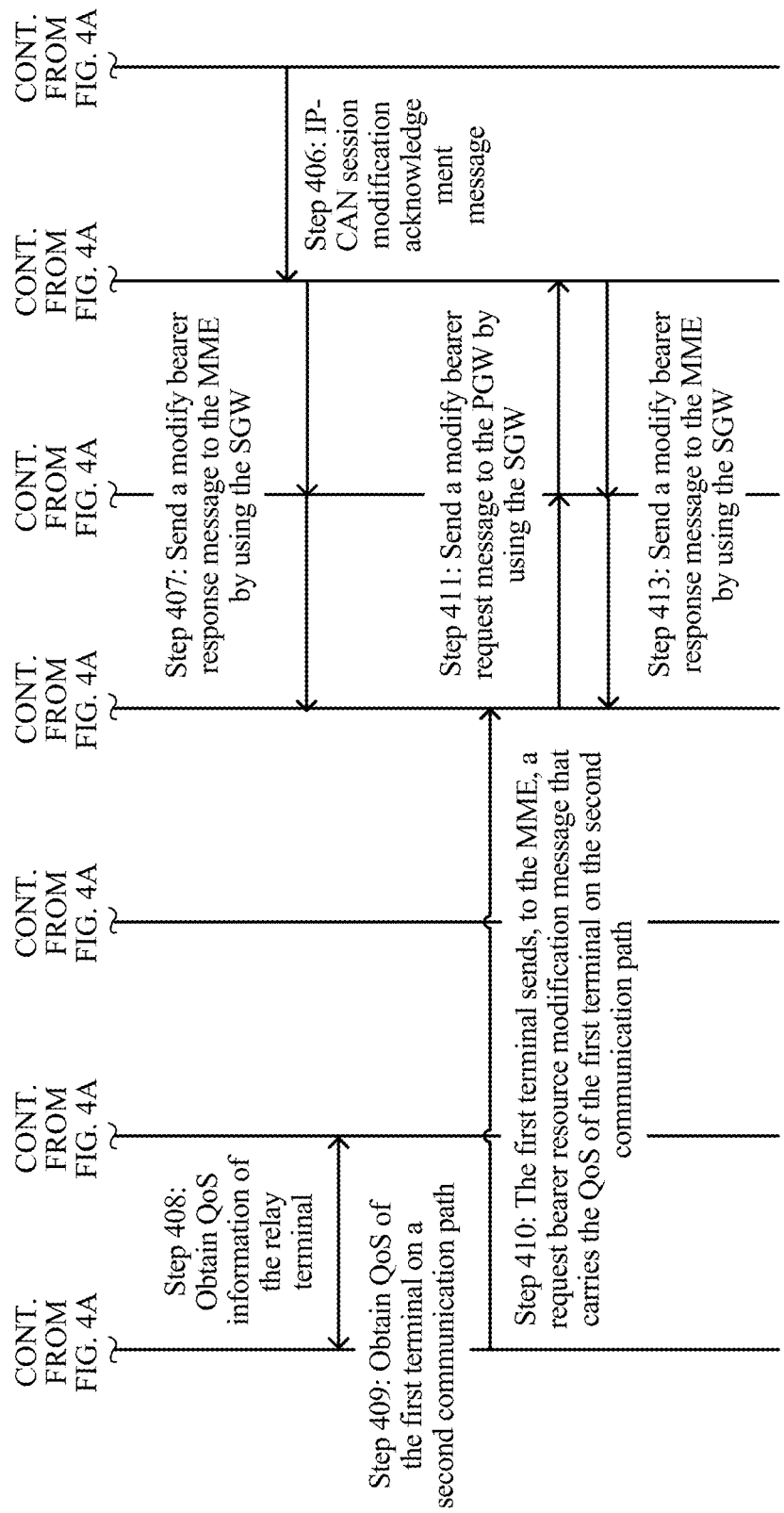

FIG. 4A and FIG. 4B are a second information interaction diagram of a method for obtaining radio capability information of a terminal according to an embodiment of the present invention. As shown in FIG. 4A and FIG. 4B, when a first terminal changes from a first communication path to a second communication path, the method may include the following steps.

Step 401: The first terminal sends a service request (service request) message to an MME, where the service request message includes radio capability information of the first terminal.

Optionally, before step 401 is performed, the first terminal obtains first information. The first information includes identification information of a relay terminal and information (slide link category) about a manner of connection between the first terminal and the relay terminal, or information about a manner of connection between the first terminal and a relay terminal and radio capability information of the relay terminal. The identification information of the relay terminal may be a C-RNTI or an S-TMSI of the relay terminal. The C-RNTI is a temporary identifier allocated by an eNB to the relay terminal. The S-TMSI is a temporary identifier allocated by the MME to the relay terminal, and is used between the relay terminal and the MME in a core network. The information about the manner of connection between the first terminal and the relay terminal is used to describe a near field communication technology used for connection between the relay terminal and the first terminal, and includes but is not limited to LTE D2D, Bluetooth, and WiFi. WiFi may specifically include different supported 802.11 protocols.

The service request message is used to enable the MME to obtain the radio capability information of the first terminal. The radio capability information of the first terminal includes the information about the manner of connection between the first terminal and the relay terminal and the identification information of the relay terminal, or the radio capability information of the first terminal includes the information about the manner of connection between the first terminal and the relay terminal and the radio capability information of the relay terminal.

Optionally, the MME stores, to a radio access capability in a context of the first terminal, the information about the manner of connection between the first terminal and the relay terminal and the identification information of the relay terminal that are received.

Step 402: The MME sends a first message to an eNB, where the first message includes the radio capability information of the first terminal, so that the eNB obtains the radio capability information of the first terminal.

The eNB and the MME perform message exchange by using S1-AP signaling. The first message may be an S1-AP initial context setup request message, and the S1-AP initial context setup request message carries the radio capability information of the first terminal, so that the eNB obtains the radio capability information of the first terminal.

Step 403: When the radio capability information of the first terminal includes information about a manner of connection between the first terminal and a relay terminal and identification information of the relay terminal, the eNB obtains radio capability information of the relay terminal based on the identification information of the relay terminal, to obtain the radio capability information of the first terminal.

The radio capability information of the first terminal includes the identification information of the relay terminal and the information about the manner of connection between the first terminal and the relay terminal, or the information about the manner of connection between the first terminal and the relay terminal and the radio capability information of the relay terminal.

The eNB determines, based on the radio capability information of the relay terminal and the information about the connection between the first terminal and the relay terminal, maximum quality of service of a radio bearer used by the first terminal.

It should be noted that, step 401 to step 403 may be understood as that the eNB obtains the radio capability information of the first terminal on the second communication path.

Optionally, the first terminal sets up a radio bearer between the first terminal and the eNB based on the first message.

The first message sent by the MME to the eNB further includes bearer setup information, so that the radio bearer is set up between the first terminal and the eNB, and data transmission between the first terminal and the eNB is implemented.

Optionally, the eNB sends an S1-AP initial context setup response message to the MME, to indicate that context modification is completed.

Further, when the radio capability information of the first terminal includes the information about the manner of connection between the first terminal and the relay terminal and the identification information of the relay terminal, the MME compares the current information about the manner of connection between the first terminal and the relay terminal and identification information of the second terminal respectively with connection manner information and identification information that are stored by the MME.

If the current information about the connection manner and identification information of the second terminal are respectively the same as the connection manner information and the identification information that are stored by the MME, it indicates that the first terminal keeps working on the second communication path, that is, the first terminal always accesses the network by using the relay terminal. In this case, the procedure ends, and QoS determined by a current network side is still used.

If the current information about the connection manner and identification information of the second terminal are respectively different from the connection manner information and the identification information that are stored by the MME, or if at least one of the current information about the connection manner and identification information of the second terminal is different from the connection manner information and the identification information that are stored by the MME, the MME sends attribute information of the second communication path to a PCRF by using a gateway entity, where the attribute information of the second communication path may include access network type information of the first terminal, so that the PCRF determines a PCC rule for the first terminal based on the access network type information of the first terminal.

The MME sends a modify bearer request (modify bearer request) message to a PGW by using an SGW. The message includes but is not limited to the RAT type information, the information about the manner of connection between the first terminal and the relay terminal, the identification information of the relay terminal, and the RAT type information. The RAT type information may be an access network type of an EUTRAN, and an identifier of the relay terminal may be an IMSI.

The PGW sends an IP-CAN session modification message to the PCRF. The message may include but is not limited to the RAT type information, the identification information of the relay terminal, and the information about the manner of connection between the first terminal and the relay terminal.

The PCRF makes a decision based on the RAT type information, the identification information of the relay terminal, and the information about the manner of connection between the first terminal and the relay terminal, configures a corresponding PCC rule, and stores the PCC rule. The control policy is used to control QoS of the first terminal for accessing the network by using the second communication path.

The PCRF sends, to the PGW, an IP-CAN session modification ACK message that carries the PCC rule. The message is used to instruct the PGW to perform end-to-end bearer resource management according to the PCC rule, for example, modify a data transmission rate by modifying a data channel.

The PGW sends a modify bearer response message to the MME by using the SGW, to notify the MME that bearer modification is completed.

The first terminal obtains QoS capability information of the relay terminal, and determines QoS of the first terminal on the first communication path. The first terminal determines, based on the QoS capability information of the relay terminal and the information about the manner of connection between the first terminal and the relay terminal, the QoS of the first terminal for accessing the network by using the second communication path, where the QoS is smaller than the maximum QoS obtained by the eNB.

The first terminal sends, to the MME, a request bearer resource modification message that carries the QoS of the first terminal on the second communication path.

The MME sends a modify bearer request message to the PGW by using the SGW. The message may include but is not limited to the RAT type information, the information about the manner of connection between the first terminal and the relay terminal, and the identification information of the relay terminal.

The PGW sends a modify bearer response message to the MME by using the SGW, to notify the MME that bearer modification is completed, so that the core network determines QoS that can be used by the first terminal.

Figure 5A:
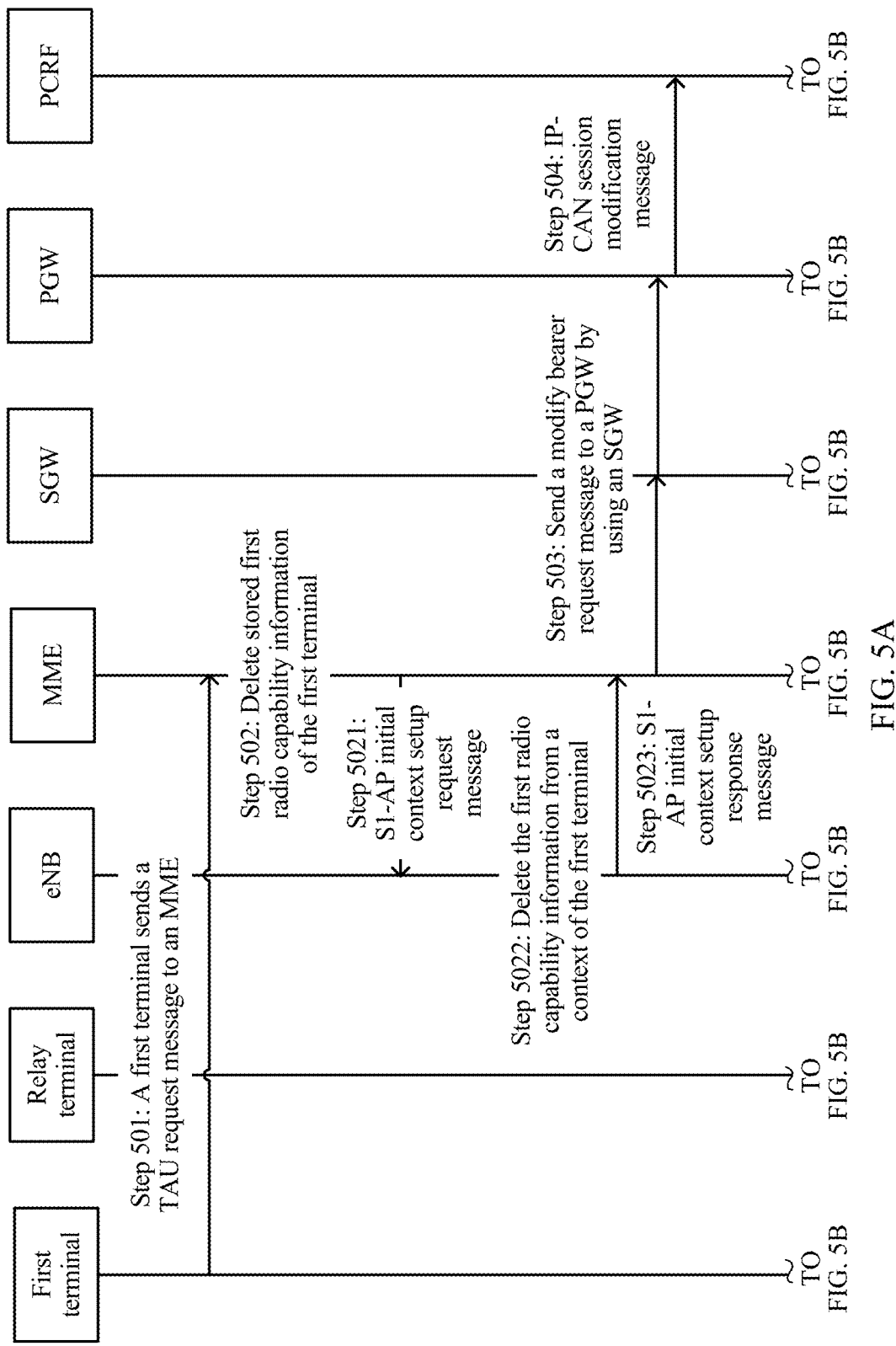
FIG. 5A and FIG. 5B are a first information interaction diagram of another method for obtaining radio capability information of a terminal according to an embodiment of the present invention.
Figure 5B:
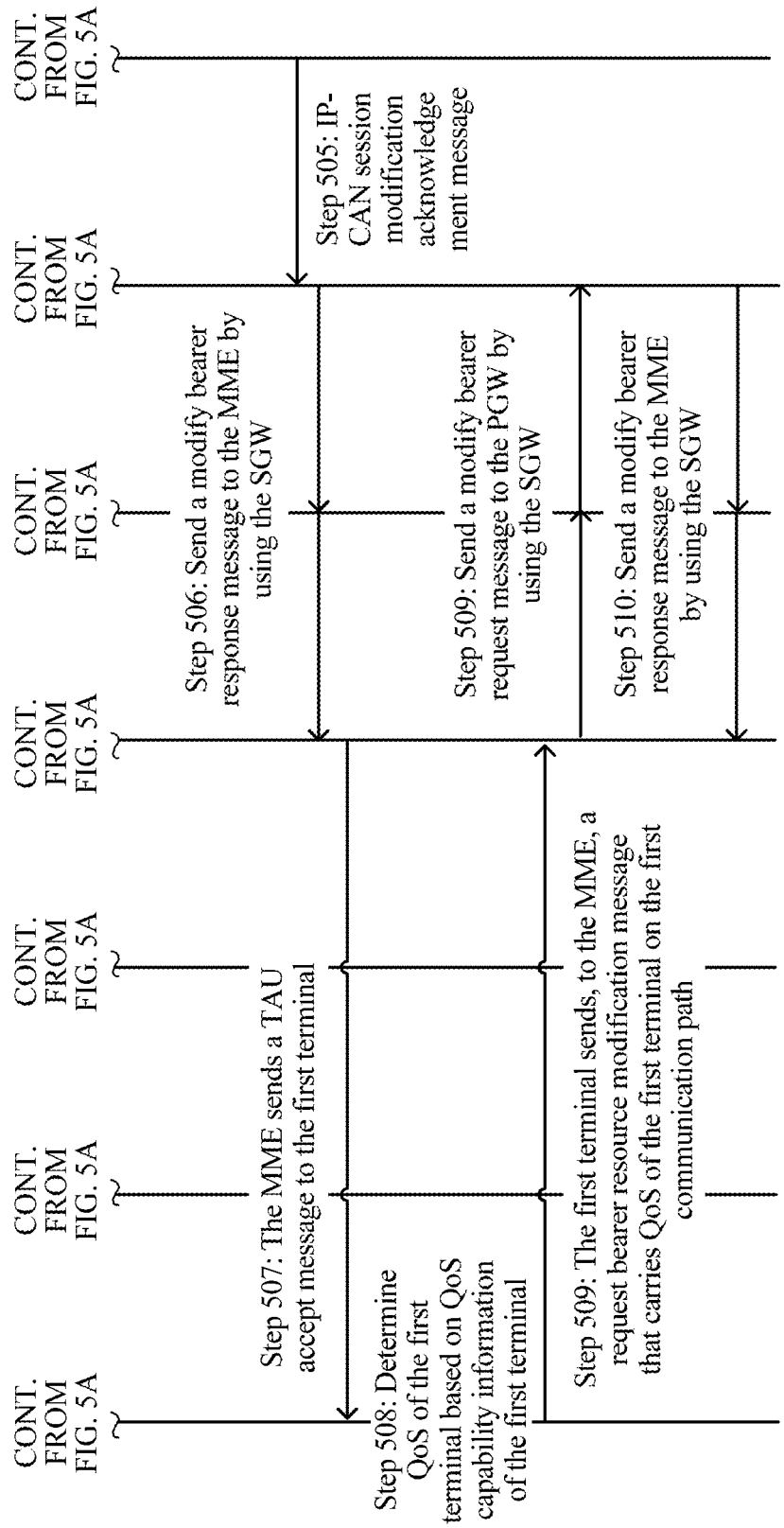

FIG. 5A and FIG. 5B are a first information interaction diagram of another method for obtaining radio capability information of a terminal according to an embodiment of the present invention.

As shown in FIG. 5A and FIG. 5B, when a first terminal changes from a second communication path to a first communication path, the method may include the following steps.

Step 501: The first terminal sends a first message to an MME, where the first message includes access path indication information of the first terminal.

The first terminal and the MME in a core network perform message exchange by using NAS signaling. The first message may be a TAU request message, and the TAU request message may include capability update indication information and the access path indication information. The first terminal notifies the MME of the radio capability update indication information and the access path indication information that are obtained after switching.

Step 502: The MME deletes, based on the access path indication information, first radio capability information of the first terminal that is stored when the first terminal accesses a network by using the second communication path, and stores, based on the access path indication information, second radio capability information of the first terminal that is obtained when the first terminal accesses the network by using the first communication path.

When the first terminal accesses the network by using the second communication path, the MME stores the first radio capability information, where the first radio capability information includes information about a manner of connection between the first terminal and a relay terminal and identification information of the relay terminal, or the first radio capability information includes information about a manner of connection between the first terminal and a relay terminal and radio capability information of the relay terminal. When the first terminal accesses the network by using the first communication path, the MME stores the second radio capability information, where the second radio capability information is radio capability information obtained when the first terminal independently accesses the network.

The MME determines, based on the access path indication information, that the first terminal has changed from the second communication path to the first communication path. Because the MME previously stored the first radio capability information, when the first terminal changes to accessing the network by using the first communication path, the MME deletes the stored first radio capability information, and stores the second radio capability information of the first terminal that is obtained when the first terminal accesses the network by using the first communication path.

Optionally, the first message may further include the capability update indication information of the first terminal. The MME sends an S1-AP initial context setup request message to an eNB based on the update indication information of the first terminal, where the S1-AP initial context setup request message may include the access path indication information and the second radio capability information, so that the eNB obtains the second radio capability information.

Optionally, the eNB deletes the stored first radio capability information based on the access path indication information of the first terminal.

The eNB may delete, from a context of the first terminal, the information about the manner of connection between the first terminal and the relay terminal and the identification information of the relay terminal that are stored, or delete the information about the manner of connection between the first terminal and the relay terminal and the radio capability information of the relay terminal that are stored, and store the second radio capability information. To be specific, the eNB obtains the radio capability information obtained when the first terminal accesses the network by using the first communication path.

Optionally, the first terminal sets up a radio bearer between the first terminal and the eNB based on the first message.

The first message sent by the MME to the eNB further includes bearer setup information, so that the radio bearer is set up between the first terminal and the eNB, and data transmission between the first terminal and the eNB is implemented.

Optionally, the eNB sends an S1-AP initial context setup response message to the MME.

Further, the MME sends attribute information of the first communication path to a PCRF by using a gateway entity, where the attribute information of the first communication path may include access network type information of the first terminal, so that the PCRF determines a PCC rule for the first terminal based on the access network type information of the first terminal.

The MME obtains, based on the received second radio capability information of the first terminal, RAT type information of the first terminal for accessing the network by using the first communication path.

The MME sends a modify bearer request message to a PGW by using an SGW, where the message includes but is not limited to the RAT type. The RAT type information may be an access network type of an EUTRAN, and an identifier of the relay terminal may be an IMSI.

The PGW sends an IP-CAN session modification (IP-CAN Session Modification) message to the PCRF. The message may include but is not limited to the RAT type information.

The PCRF makes a decision based on the RAT type information, configures a corresponding control policy (English: Policy Control and Charging, PCC) rule, and stores the PCC rule. The control policy is used to control QoS of the first terminal for accessing the network by using the first communication path.

The PCRF sends an IP-CAN session modification acknowledgement (IP-CAN session modification ACK) message to the PGW, where the message carries the PCC rule. The message is used to instruct the PGW to perform end-to-end bearer resource management according to the PCC rule, for example, modify a data transmission rate by modifying a data channel.

The PGW sends a modify bearer response (modify bearer response) message to the MME by using the SGW, to notify the MME that bearer modification is completed.

The first terminal determines QoS of the first terminal on the first communication path based on supported QoS capability information.

The first terminal sends, to the MME, a request bearer resource modification (request bearer resource modification) message that carries the QoS of the first terminal on the first communication path.

The MME sends a modify bearer request message to the PGW by using the SGW. The message may include but is not limited to the RAT type information.

The PGW sends a modify bearer response message to the MME by using the SGW, to notify the MME that bearer modification is completed, so that the core network determines QoS that can be used by the first terminal.

Figure 6A:
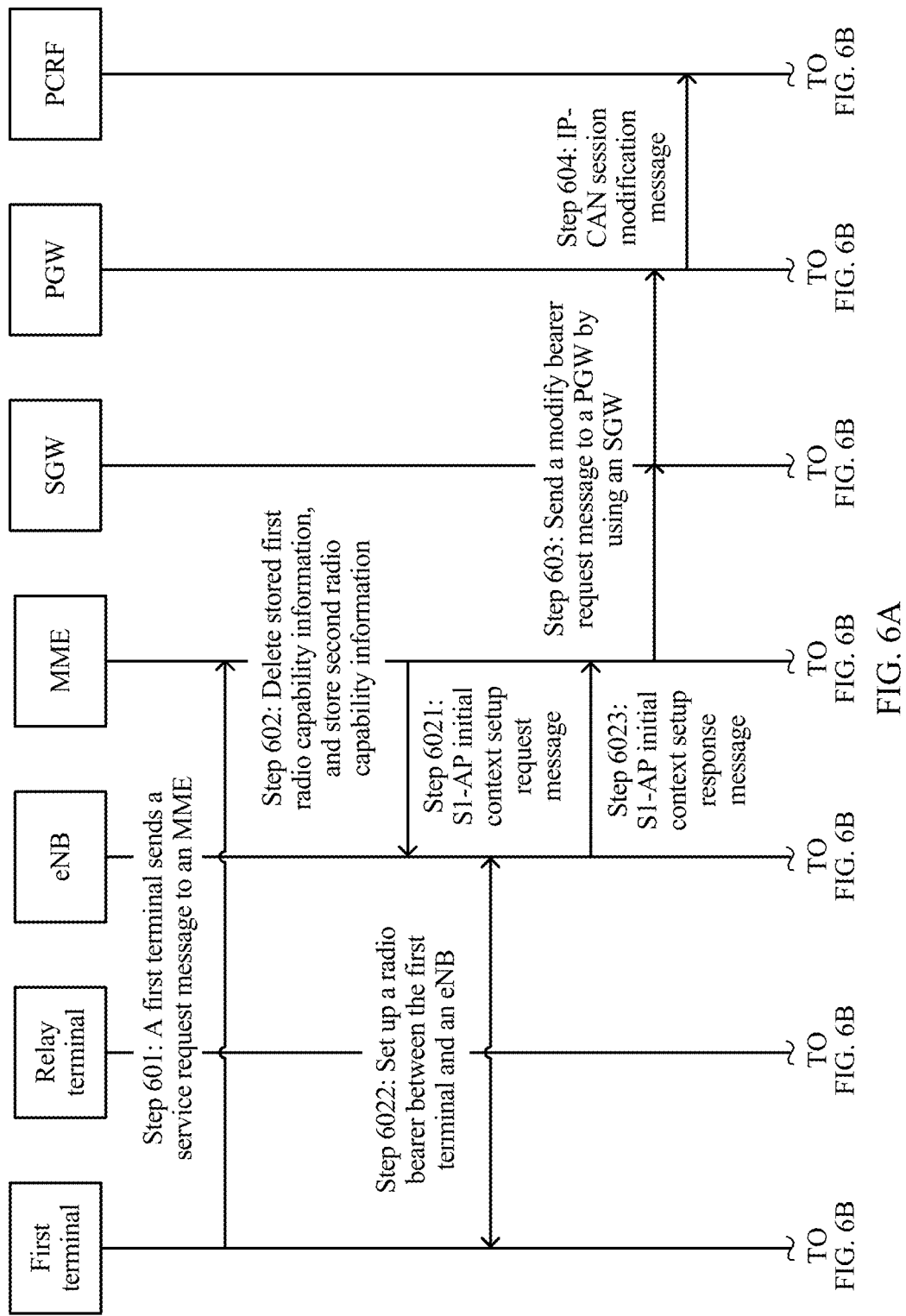
FIG. 6A and FIG. 6B are a second information interaction diagram of another method for obtaining radio capability information of a terminal according to an embodiment of the present invention.
Figure 6B:
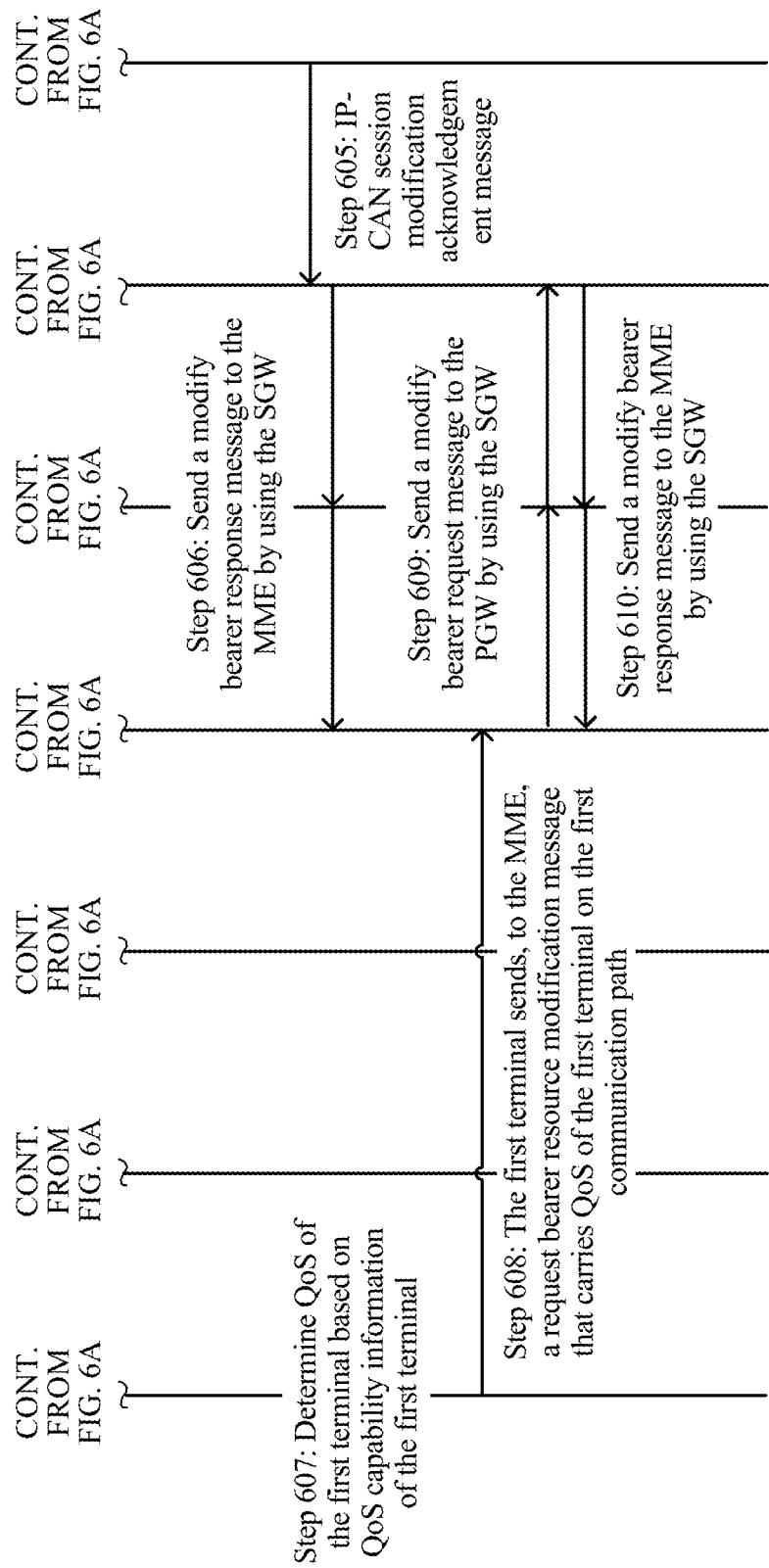

FIG. 6A and FIG. 6B are a second information interaction diagram of another method for obtaining radio capability information of a terminal according to an embodiment of the present invention.

As shown in FIG. 6A and FIG. 6B, when a first terminal changes from a second communication path to a first communication path, the method may include the following steps.

Step 601: The first terminal sends a first message to an MME, where the first message includes access path indication information of the first terminal.

The first terminal and the MME in a core network perform message exchange by using NAS signaling. The first message may be a service request message, and the service request message may include the access path indication information. The first terminal notifies the MME of the access path indication information that is obtained after switching.

Step 602: The MME deletes, based on the access path indication information, first radio capability information of the first terminal that is stored when the first terminal accesses a network by using the second communication path, and stores, based on the access path indication information, second radio capability information of the first terminal that is obtained when the first terminal accesses the network by using the first communication path.

When the first terminal accesses the network by using the second communication path, the MME stores the first radio capability information, where the first radio capability information includes information about a manner of connection between the first terminal and a relay terminal and the identification information of the relay terminal, or the first radio capability information includes information about a manner of connection between the first terminal and a relay terminal and radio capability information of the relay terminal. When the first terminal accesses the network by using the first communication path, the MME stores the second radio capability information, where the second radio capability information is radio capability information obtained when the first terminal independently accesses the network.

The MME determines, based on the access path indication information, that the first terminal has changed from the second communication path to the first communication path. Because the MME previously stored the first radio capability information, when the first terminal changes to accessing the network by using the first communication path, the MME deletes the stored first radio capability information, and stores the second radio capability information of the first terminal that is obtained when the first terminal accesses the network by using the first communication path.

Optionally, the MME sends an S1-AP initial context setup request (S1-AP initial context setup request) message to an eNB based on the access path indication information, where the S1-AP initial context setup request message includes the second radio capability information, so that the eNB obtains the second radio capability information.

Optionally, the eNB sends an S1-AP initial context setup response message to the MME.

Further, the MME sends attribute information of the first communication path to a PCRF by using a gateway entity, where the attribute information of the first communication path includes access network type information of the first terminal, so that the PCRF determines a PCC rule for the first terminal based on the access network type information of the first terminal.

Optionally, the MME obtains, based on the received second radio capability information of the first terminal, RAT type information of the first terminal for accessing the network by using the first communication path.

The MME sends a modify bearer request message to a PGW by using an SGW. The message may include but is not limited to the RAT type. The RAT type information may be an access network type of an EUTRAN, and an identifier of the relay terminal may be an IMSI.

The PGW sends an IP-CAN session modification message to the PCRF, where the message includes but is not limited to the RAT type information.

The PCRF makes a decision based on the RAT type information, configures a corresponding control policy PCC rule, and stores the PCC rule. The control policy is used to control QoS of the first terminal for accessing the network by using the first communication path.

The PCRF sends an IP-CAN session modification ACK message to the PGW, where the message carries the PCC rule. The message is used to instruct the PGW to perform end-to-end bearer resource management according to the PCC rule, for example, modify a data transmission rate by modifying a data channel.

The PGW sends a modify bearer response (modify bearer response) message to the MME by using the SGW, to notify the MME that bearer modification is completed.

Further, the first terminal determines the QoS of the first terminal on the first communication path based on QoS capability information supported by the first terminal.

The first terminal sends, to the MME, a request bearer resource modification message that carries the QoS of the first terminal on the first communication path.

The MME sends a modify bearer request message to the PGW by using the SGW. The message may include but is not limited to the RAT type information.

The PGW sends a modify bearer response message to the MME by using the SGW, to notify the MME that bearer modification is completed, so that the core network determines QoS that can be used by the first terminal.

When a first terminal changes from a first communication path to a second communication path of accessing a network by using a second terminal, descriptions of a core network entity, a base station, and the first terminal are as follows.

Figure 7:
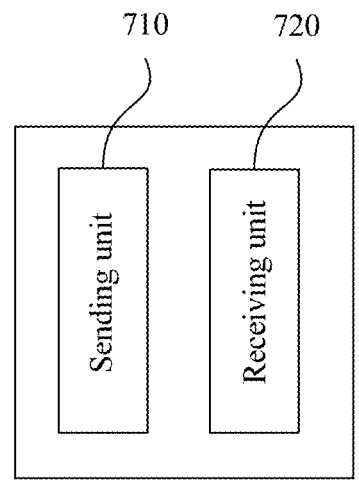
FIG. 7 is a schematic structural diagram of a core network entity according to an embodiment of the present invention.

FIG. 7 is a schematic structural diagram of a core network entity in the foregoing embodiments. As shown in FIG. 7, the core network entity may include a sending unit 710 and a receiving unit 720.

The sending unit 710 is configured to send a first message to a base station, where the first message is used to trigger the base station to obtain radio capability information of a first terminal from the first terminal.

The receiving unit 720 is configured to receive a second message sent by the base station, where the second message includes the radio capability information of the first terminal.

The radio capability information of the first terminal includes information about a manner of connection between the first terminal and a second terminal and identification information of the second terminal, or the radio capability information of the first terminal includes information about a manner of connection between the first terminal and a second terminal and radio capability information of the second terminal.

Optionally, the core network entity further includes a determining unit 730.

Before the sending unit 710 sends the first message to the base station, the receiving unit 720 is further configured to receive a third message sent by the first terminal, where the third message includes capability update indication information and access path indication information of the first terminal.

The determining unit 730 is configured to determine, based on the capability update indication information of the first terminal received by the receiving unit 720, that a network access manner of the first terminal changes; and determine, based on the access path indication information of the first terminal received by the receiving unit 720, that the first terminal changes from a first communication path to a second communication path.

Optionally, the sending unit 710 is further configured to send attribute information of the second communication path to a PCRF by using a gateway entity, where the attribute information of the second communication path includes the information about the manner of connection between the first terminal and the second terminal and the identification information of the second terminal, so that the PCRF determines a PCC rule for the first terminal based on the information about the manner of connection between the first terminal and the second terminal and the identification information of the second terminal.

Optionally, the attribute information of the second communication path sent by the sending unit 710 further includes access network type information, so that the PCRF determines the PCC rule for the first terminal based on the information about the manner of connection between the first terminal and the second terminal, the identification information of the second terminal, and the access network type information.

Figure 8:
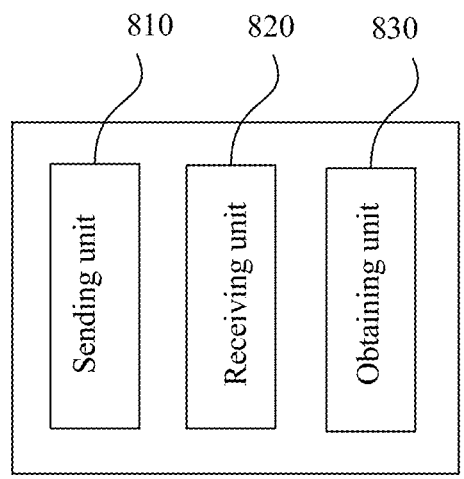
FIG. 8 is a schematic structural diagram of a base station according to an embodiment of the present invention.

FIG. 8 is a schematic structural diagram of a base station in the foregoing embodiments. As shown in FIG. 8, the base station may include a sending unit 810, a receiving unit 820, and an obtaining unit 830.

The receiving unit 820 is configured to receive a first message sent by an MME.

The obtaining unit 830 is configured to obtain radio capability information of a first terminal from the first terminal based on the first message received by the receiving unit 820.

The sending unit 810 is configured to send a second message to the MME, where the second message includes the radio capability information of the first terminal, so that the MME obtains the radio capability information of the first terminal.

The radio capability information of the first terminal includes information about a manner of connection between the first terminal and a second terminal and identification information of the second terminal, or the radio capability information of the first terminal includes information about a manner of connection between the first terminal and a second terminal and radio capability information of the second terminal.

Optionally, when the radio capability information of the first terminal includes the information about the manner of connection between the first terminal and the second terminal and the identification information of the second terminal, the base station further includes a determining unit 840.

The obtaining unit 830 is further configured to obtain the radio capability information of the second terminal based on the identification information of the second terminal.

The determining unit 840 is configured to determine, based on the radio capability information of the second terminal and the information about the manner of connection between the first terminal and the second terminal, quality of service of a radio bearer used by the first terminal.

Optionally, the obtaining unit 830 is specifically configured to send a third message to the first terminal by using the sending unit 810, and receive, by using the receiving unit 820, the radio capability information of the first terminal that is sent by the first terminal based on the third message.

Figure 9:
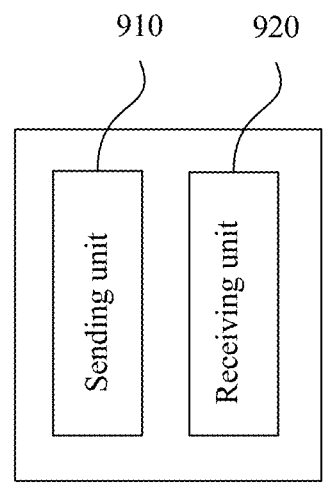
FIG. 9 is a schematic structural diagram of a terminal according to an embodiment of the present invention.

FIG. 9 is a schematic structural diagram of a terminal in the foregoing embodiments. As shown in FIG. 9, the terminal may include a sending unit 910 and a receiving unit 920.

The receiving unit 910 is configured to receive a first message sent by a base station.

The sending unit 920 is configured to send radio capability information of a first terminal to the base station based on the first message received by the receiving unit 910.

The radio capability information of the first terminal includes information about a manner of connection between the first terminal and a second terminal and identification information of the second terminal, or the radio capability information of the first terminal includes information about a manner of connection between the first terminal and a second terminal and radio capability information of the second terminal.

Optionally, the terminal further includes an obtaining unit 930. The obtaining unit 930 is configured to obtain the information about the manner of connection between the first terminal and the second terminal and the identification information of the second terminal.

Optionally, the sending unit 910 is further configured to send a second message to an MME, where the second message includes capability update indication information and access path indication information of the first terminal, so that the MME determines, based on the update indication information of the first terminal, that a network access manner of the first terminal changes, and the MME sends a third message to the base station, and determines, based on the access path indication information of the first terminal, that the first terminal changes from a first communication path to a second communication path.

Figure 10:
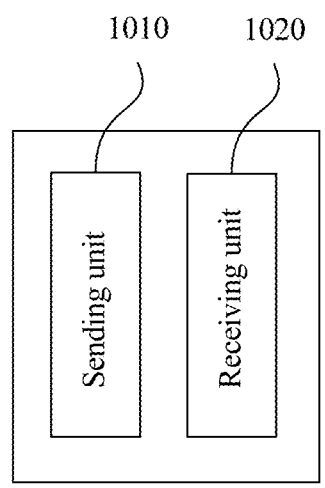
FIG. 10 is a schematic structural diagram of another core network entity according to an embodiment of the present invention.

FIG. 10 is a schematic structural diagram of another core network entity in the foregoing embodiments. As shown in FIG. 10, the core network entity may include a sending unit 1010 and a receiving unit 1020.

The receiving unit 1020 is configured to receive a first message sent by the first terminal, where the first message includes radio capability information of the first terminal.

The sending unit 1010 is configured to send a second message to a base station, where the second message includes the radio capability information of the first terminal, so that the base station obtains the radio capability information of the first terminal.

The radio capability information of the first terminal includes information about a manner of connection between the first terminal and a second terminal and identification information of the second terminal; or the radio capability information of the first terminal includes information about a manner of connection between the first terminal and a second terminal and radio capability information of the second terminal.

Optionally, when the radio capability information of the first terminal includes the information about the manner of connection between the first terminal and the second terminal and the identification information of the second terminal, the core network entity further includes a comparison unit 1030. The comparison unit 1030 is configured to compare the information about the connection manner and the identification information of the second terminal respectively with connection manner information and identification information that are stored by the MME.

If the information about the connection manner and the identification information of the second terminal are respectively different from the connection manner information and the identification information that are stored by the MME, or if at least one of the information about the connection manner and the identification information of the second terminal is different from the connection manner information and the identification information that are stored by the MME, the sending unit 1010 sends attribute information of a second communication path to a PCRF by using a gateway entity, where the attribute information of the second communication path includes the information about the manner of connection between the first terminal and the second terminal and the identification information of the second terminal, so that the PCRF determines a PCC rule for the first terminal based on the information about the manner of connection between the first terminal and the second terminal and the identification information of the second terminal.

Optionally, the attribute information of the second communication path sent by the sending unit 1010 further includes access network type information, so that the PCRF determines the PCC rule for the first terminal based on the information about the manner of connection between the first terminal and the second terminal, the identification information of the second terminal, and the access network type information.

Figure 11:
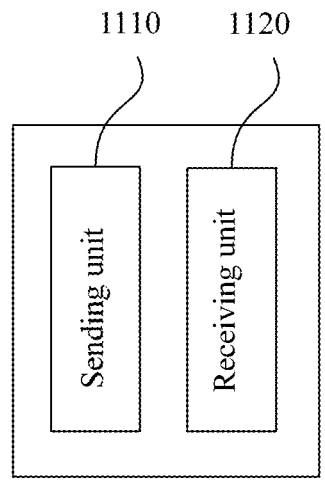
FIG. 11 is a schematic structural diagram of another base station according to an embodiment of the present invention.

FIG. 11 is a schematic structural diagram of another base station in the foregoing embodiments. As shown in FIG. 11, the base station may include a sending unit 1110 and a receiving unit 1120.

The receiving unit 1120 is configured to receive a first message sent by an MME, where the first message includes radio capability information of a first terminal.

The radio capability information of the first terminal includes information about a manner of connection between the first terminal and a second terminal and identification information of the second terminal, or the radio capability information of the first terminal includes information about a manner of connection between the first terminal and a second terminal and radio capability information of the second terminal.

Optionally, when the radio capability information of the first terminal includes the information about the manner of connection between the first terminal and the second terminal and the identification information of the second terminal, the base station further includes an obtaining unit 1130 and a determining unit 1140.

The obtaining unit 1130 is configured to obtain the radio capability information of the second terminal based on the identification information of the second terminal.

The determining unit 1140 is configured to determine, based on the radio capability information of the second terminal obtained by the obtaining unit 1130 and the information about the connection between the first terminal and the second terminal, quality of service of a radio bearer used by the first terminal.

Figure 12:
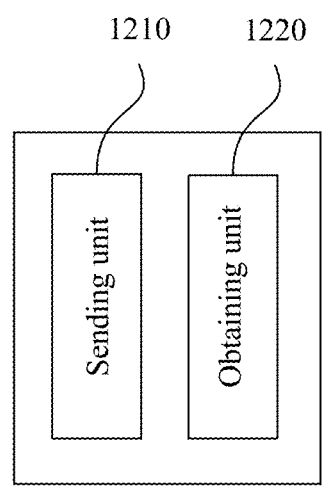
FIG. 12 is a schematic structural diagram of another terminal according to an embodiment of the present invention.

FIG. 12 is a schematic structural diagram of another terminal in the foregoing embodiments. As shown in FIG. 12, the terminal may include a sending unit 1210 and an obtaining unit 1220.

The obtaining unit 1220 is configured to obtain information about a manner of connection between a first terminal and a second terminal and identification information of the second terminal.

The sending unit 1210 is configured to send a first message to an MME, where the first message includes radio capability information of the first terminal, so that the MME sends a second message to a base station, where the second message includes the radio capability information of the first terminal.

The radio capability information of the first terminal includes the information about the manner of connection between the first terminal and the second terminal and the identification information of the second terminal, or the radio capability information of the first terminal includes the information about the manner of connection between the first terminal and the second terminal and radio capability information of the second terminal.

Optionally, the obtaining unit 1220 is further configured to obtain the radio capability information of the second terminal based on the identification information of the second terminal.

The radio capability information of the first terminal includes the information about the manner of connection between the first terminal and the second terminal and the radio capability information of the second terminal.

When a first terminal changes from a second communication path of accessing a network by using a second terminal to a first communication path, descriptions of a core network entity, a base station, and the first terminal are as follows.

Figure 13:
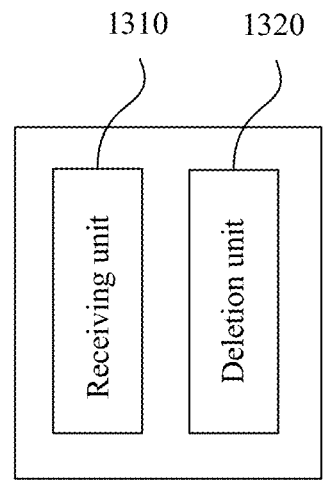
FIG. 13 is a schematic structural diagram of still another core network according to an embodiment of the present invention.

FIG. 13 is a schematic structural diagram of still another core network entity in the foregoing embodiments. As shown in FIG. 13, the core network entity may include a receiving unit 1310 and a deletion unit 1320.

The receiving unit 1310 is configured to receive a first message sent by a first terminal, where the first message includes access path indication information of the first terminal.

The deletion unit 1320 is configured to delete, based on the access path indication information received by the receiving unit, first radio capability information of the first terminal that is stored when the first terminal accesses a network by using a second communication path, and store, based on the access path indication information received by the receiving unit, second radio capability information of the first terminal that is obtained when the first terminal accesses the network by using a first communication path.

Optionally, when the first message further includes capability update indication information of the first terminal, the core network entity further includes a sending unit 1330. The sending unit 1330 is configured to send a second message to a base station based on the capability update indication information of the first terminal received by the receiving unit, where the second message includes the access path indication information and the second radio capability information.

Optionally, the sending unit 1330 is further configured to send a third message to the base station based on the access path indication information received by the receiving unit 1310, where the third message includes the second radio capability information.

Optionally, the sending unit 1330 is further configured to send attribute information of the first communication path to a PCRF by using a gateway entity, where the attribute information of the first communication path includes access network type information of the first terminal, so that the PCRF determines a PCC rule for the first terminal based on the access network type information of the first terminal.

Figure 14:
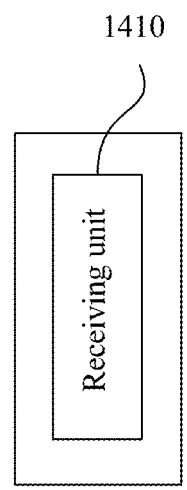
FIG. 14 is a schematic structural diagram of still another base station according to an embodiment of the present invention.

FIG. 14 is a schematic structural diagram of still another base station in the foregoing embodiments. As shown in FIG. 14, the base station may include a receiving unit 4110.

The receiving unit 4110 is configured to receive a first message sent by an MME, where the first message includes first radio capability information of a first terminal that is obtained when the first terminal accesses a network by using a first communication path.

Optionally, when the first message further includes access path indication information of the first terminal, the base station further includes a deletion unit 4120.

The deletion unit 4120 is configured to delete, based on the access path indication information of the first terminal received by the receiving unit 4110, second radio capability information of the first terminal that is stored when the first terminal accesses the network by using a second communication path.

Figure 15:
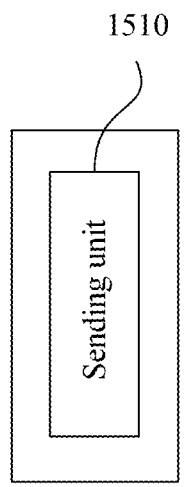
FIG. 15 is a schematic structural diagram of still another terminal according to an embodiment of the present invention.

FIG. 15 is a schematic structural diagram of a terminal in the foregoing embodiments. As shown in FIG. 15, the terminal may include a sending unit 1501.

The sending unit 1501 is configured to send a first message to an MME, where the first message includes access path indication information of a first terminal, so that the MME deletes, based on the access path indication information, first radio capability information of the first terminal that is stored when the first terminal accesses a network by using a second communication path, and stores, based on the access path indication information, second radio capability information of the first terminal that is obtained when the first terminal accesses the network by using a first communication path.

Optionally, the first message sent by the sending unit further includes capability update indication information of the first terminal, where the capability update indication information is used to enable the MME to send a second message to a base station.

Figure 16:
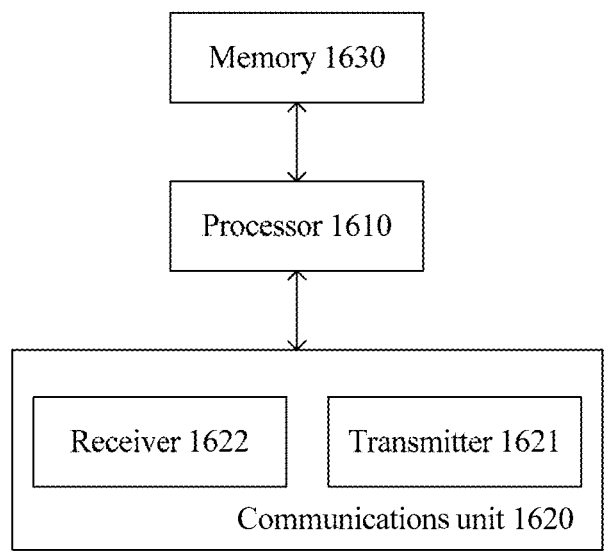
FIG. 16 is a schematic structural diagram of yet another core network according to an embodiment of the present invention.

FIG. 16 is a design block diagram of a core network apparatus in the foregoing embodiments. A core network may be an EPC network, and the core network apparatus may be an MME, an SGW, a PGW, or any combination thereof.

The core network apparatus may include: a processor 1610, configured to control and manage actions of the core network apparatus, and perform various functions to support a communications service of a first terminal. For example, the processor 1610 is configured to support the core network apparatus in performing the step, in FIG. 3A and FIG. 3B, in which the core network apparatus determines, based on the access path indication information, that the first terminal changes from the first communication path to the second communication path, and retains radio capability information of the first terminal that is stored when the first terminal is on the first communication path, the step, in FIG. 4A and FIG. 4B, in which the core network apparatus stores, to a radio access capability in a context of the terminal, the information about the manner of connection between the first terminal and the relay terminal and the identification information of the relay terminal that are received, step 502 in FIG. 5A, step 602 in FIG. 6A, and/or another process used for the technology described in the specification.

The core network apparatus may further include: a communications unit 1620, configured to support communication with another network entity, for example, communication with the base station and the first terminal in FIG. 3A to FIG. 6B, and communication between network entities, where the communications unit 1620 may include a transmitter 1621 and a receiver 1622; and a memory 1630, configured to store program code and data of the core network apparatus.

Figure 17:
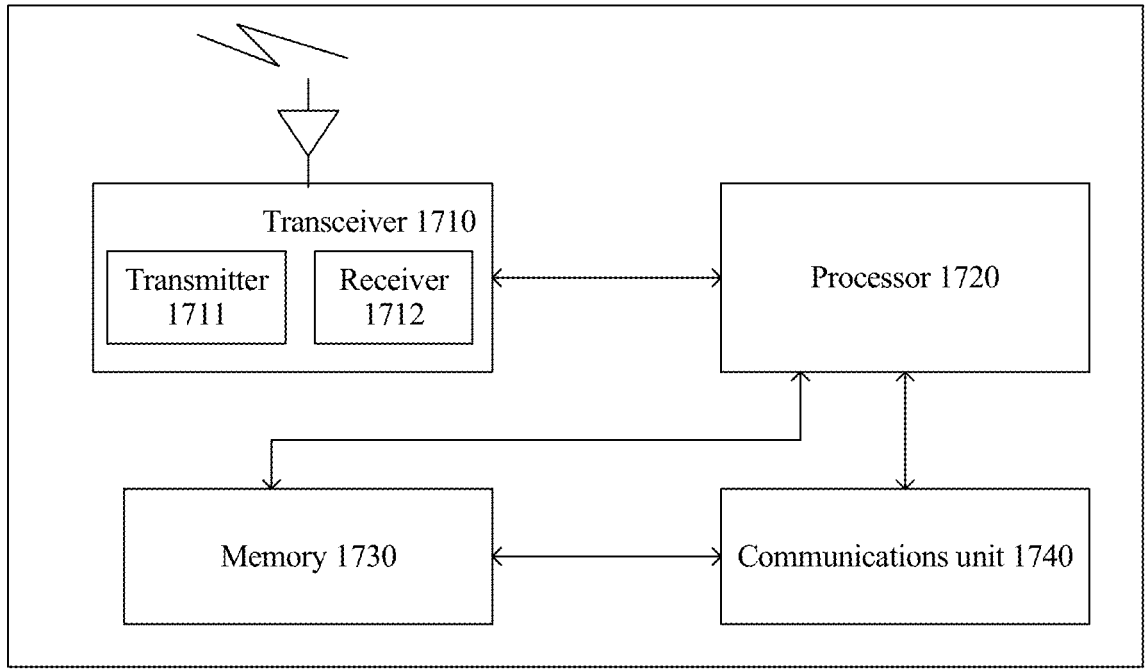
FIG. 17 is a schematic structural diagram of yet another base station according to an embodiment of the present invention.

FIG. 17 is a design block diagram of a base station in the foregoing embodiments.

The base station may include a transceiver 1710 and a processor 1720.

The transceiver 1710 is configured to support information receiving and transmission between the base station and the first terminal in the foregoing embodiments, and support radio communication between the first terminal and another terminal. The transceiver 1710 may include a transmitter 1711 and a receiver 1712. The processor 1720 performs functions used for communication with the first terminal. On an uplink, an uplink signal from the first terminal is received by using an antenna, is demodulated by the transceiver 1710, and is further processed by the processor 1720 to restore service data and signaling information sent by the first terminal. On a downlink, service data and a signaling message are processed by the processor 1720, and are demodulated by the transceiver 1710 to generate a downlink signal, and the downlink signal is transmitted to the first terminal by using the antenna.

The base station may further include: a memory 1730, configured to store program code and data of the base station; and a communications unit 1740, configured to support communication with another network entity, for example, configured to support communication between the base station and another communications network entity shown in FIG. 3A to FIG. 6B, such as the MME, the SGW, and/or the PGW in the core network EPC.

Figure 18:
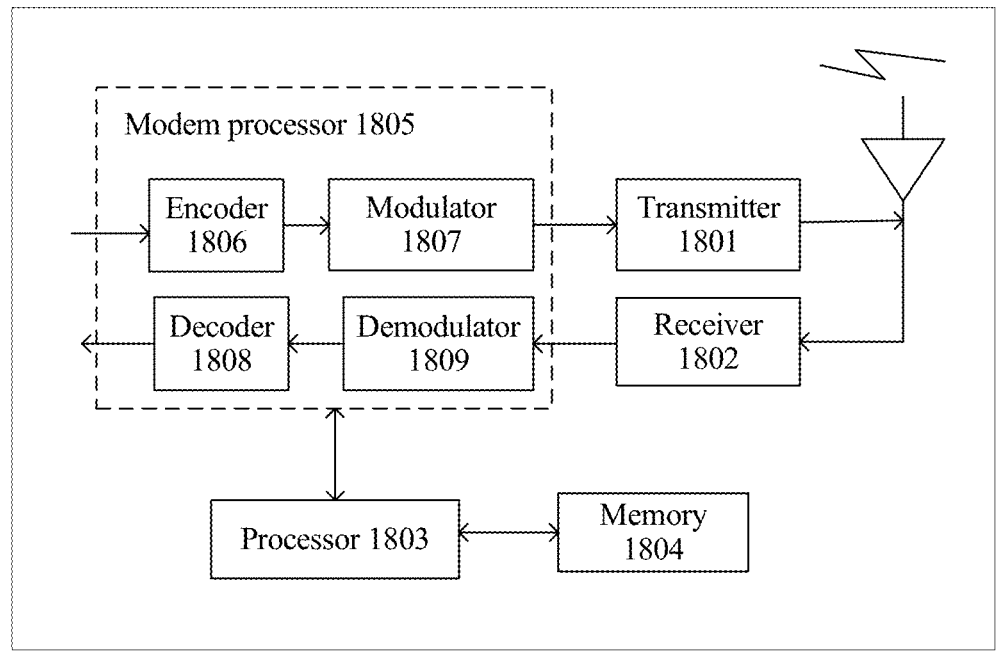
FIG. 18 is a schematic structural diagram of yet another terminal according to an embodiment of the present invention.

FIG. 18 is a simplified schematic diagram of a possible design structure of a terminal in the foregoing embodiments.

A first terminal may include a transmitter 1801, a receiver 1802, a processor 1803, and a modem processor 1805.

The transmitter 1801 adjusts an output sample and generates an uplink signal, where the uplink signal is transmitted to the base station or the core network in the foregoing embodiments by using an antenna, and performs steps such as communication between the first terminal and the base station or the MME in the core network in FIG. 3A to FIG. 6B. On a downlink, the antenna receives a downlink signal that is transmitted by the base station or the core network in the foregoing embodiments. The receiver 1802 adjusts the signal received by the antenna and provides an input sample, and performs steps such as communication between the first terminal and the base station or the MME in the core network in FIG. 3A to FIG. 6B. In the modem processor 1805, an encoder 1806 receives service data and a signaling message that are to be sent on an uplink, and processes (for example, performs formatting, encoding, and interleaving) the service data and the signaling message. A modulator 1807 further processes (for example, performs symbol mapping and modulation) encoded service data and signaling message and provides an output sample. A demodulator 1809 processes (for example, demodulates) the input sample and provides symbol estimation. A decoder 1808 processes (for example, de-interleaves and decodes) the symbol estimation and provides decoded data and signaling message that are sent to UE. The encoder 1806, the modulator 1807, the demodulator 1809, and the decoder 1808 may be implemented by using the integrated modem processor 1805. The foregoing components perform processing according to a radio access technology (for example, an access technology in LTE and another evolved system) used by a radio access network.

The first terminal may further include: a memory 1804, configured to store program code and data used for the first terminal. The processor 1803 controls and manages actions of the first terminal, and is configured to perform processing performed by the first terminal in the foregoing embodiments, for example, perform the step, in FIG. 3A to FIG. 4B, in which the first terminal obtains QoS capability information of the relay terminal, and determines QoS of the first terminal on the first communication path, and perform the step, in FIG. 5A to FIG. 6B, in which the first terminal determines QoS of the first terminal on the first communication path based on QoS capability information supported by the first terminal.

The processor for performing functions of the foregoing base station, terminal, or core network apparatus in the present invention may be a central processing unit (CPU), a general purpose processor, a digital signal processor (English: digital signal processing, DSP), an application-specific integrated circuit (English: application-specific integrated circuit, ASIC), a field-programmable gate array (English: field-programmable gate array, FPGA) or another programmable logic device, a transistor logic device, a hardware component, or any combination thereof. It may implement or execute various examples of logical blocks, modules, and circuits that are described with reference to the content disclosed in the present invention. The processor may also be a combination of computing functions, for example, a combination of one or more microprocessors or a combination of a DSP and a microprocessor.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory (English: non-transitory) medium, such as a random-access memory, read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely examples of embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for obtaining radio capability information of a terminal, wherein the method comprises:

directly accessing, by a first terminal, a network via a first communication path;

switching, by the first terminal, the access to the network from the first communication to a second communication path, wherein in the second communication path, the first terminal is configured to access the network through a second terminal, second terminal having a higher radio capability than the first terminal;

receiving, by the first terminal, a first message sent by a base station of the network, the first message being configured for obtaining radio capability information of the first terminal; and in response to the first message, sending, by the first terminal, the radio capability information of the first terminal to the base station, wherein the radio capability information of the first terminal comprises information about a connection between the first terminal and the second terminal and, identification information of the second terminal, or radio capability information of the second terminal, before receiving, by the first terminal, the first message sent by the base station, further comprising:

sending, by the first terminal, a second message to a mobility management entity (MME), wherein the second message comprises capability update indication information and access path indication information of the first terminal, so that the MME is enabled to:

determine, based on the update indication information of the first terminal, that a network access manner of the first terminal has changed, and send a third message to the base station, and determines, based on the access path indication information of the first terminal, that the first terminal changes from the first communication path to the second communication path.

2. The method according to claim 1, wherein before sending, by the first terminal, the radio capability information of the first terminal to the base station, the method further comprises:

obtaining, by the first terminal, the information about a manner of the connection between the first terminal and the second terminal and the identification information of the second terminal.

3. A method for obtaining radio capability information of a terminal, wherein the method comprises:

determining, by a mobility management entity (MME), that a first terminal has changed its access to a network from a first communication path to a second communication path, wherein the first terminal directly accesses the network in the first communication path, and accesses the network indirectly thorough a second terminal in the second communication path, the second terminal having a higher radio capability than the first terminal;

sending, by the MME, a first message to a base station of the network, wherein the first message is configured for triggering the base station to obtain radio capability information of the first terminal from the first terminal; and receiving, by the MME, a second message sent by the base station, wherein the second message comprises the radio capability information of the first terminal, and the radio capability information of the first terminal comprises information about a manner of a connection between the first terminal and the second terminal and, identification information of the second terminal, or radio capability information of the second terminal, wherein before sending, by the MME, the first message to the base station, the method further comprises:

receiving, by the MME, a third message sent by the first terminal, wherein the third message comprises capability update indication information and access path indication information of the first terminal; and, wherein the determination by the MME that first terminal has changed its access to the network from the first communication path to the second communication path is based on the third message.

4. The method according to claim 3, wherein after the MME obtains the radio capability information of the first terminal, the method further comprises:

sending, by the MME, attribute information of the second communication path to a Policy and Charging Rule Function (PCRF) by using a gateway entity, wherein the attribute information of the second communication path comprises the information about the manner of the connection between the first terminal and the second terminal and the identification information of the second terminal, so that the PCRF is enabled to determine a Policy Control and Charging (PCC) rule for the first terminal based on the information about the manner of the connection between the first terminal and the second terminal and the identification information of the second terminal.

5. The method according to claim 4, wherein the attribute information of the second communication path further comprises access network type information, so that the PCRF is enabled to determine the PCC rule for the first terminal based on the information about the manner of the connection between the first terminal and the second terminal, the identification information of the second terminal, and the access network type information.

6. A terminal comprising:

a processor configured to:

directly access a network via a first communication path; and switch the access to the network from the first communication to a second communication path, wherein in the second communication path, the terminal is configured to access the network through a second terminal, second terminal having a higher radio capability than the terminal;

a receiver, configured to receive a first message sent by a base station, wherein the first message is configured for the base station to obtain radio capability information of the terminal; and a transmitter, configured to in response to the first message, send the radio capability information of the first terminal to the base station, wherein the radio capability information of the first terminal comprises information about a manner of a connection between the first terminal and the second terminal and, identification information of the second terminal, or radio capability information of the second terminal, wherein before the receiver receives the first message sent by the base station, the transmitter is further configured to send a second message to a mobility management entity (MME), wherein the second message comprises capability update indication information and access path indication information of the first terminal, so that the MME is enabled to:

determine, based on the update indication information of the first terminal, that a network access manner of the first terminal has changed, send a third message to the base station, and determine, based on the access path indication information of the first terminal, that the first terminal has changed its access to the network from the first communication path to the second communication path.

7. The terminal according to claim 6, wherein before the transmitter sends the radio capability information of the first terminal to the base station, the processor of the terminal is further configured to:

obtain the information about the manner of connection between the first terminal and the second terminal and the identification information of the second terminal.

* * * * *